(12) United States Patent
Yamaguchi et al.

(10) Patent No.: US 9,799,894 B2
(45) Date of Patent: Oct. 24, 2017

(54) CATALYST LAYER FOR GAS DIFFUSION ELECTRODE, METHOD FOR MANUFACTURING THE SAME, MEMBRANE ELECTRODE ASSEMBLY, AND FUEL CELL

(71) Applicants: Tokyo Institute of Technology, Meguro-ku, Tokyo (JP); Kanagawa Academy of Science and Technology, Kanagawa (JP)

(72) Inventors: Takeo Yamaguchi, Tokyo (JP); Shun Ogura, Tokyo (JP); Takanori Tamaki, Tokyo (JP); Teruaki Fuchigami, Tokyo (JP); Yoshitaka Kitamoto, Tokyo (JP); Hidenori Kuroki, Kanagawa (JP)

(73) Assignee: Kanagawa Institute of Industrial Science and Technology, Kanagawa (JP)

( * ) Notice: Subject to any disclaimer, the term of this patent is extended or adjusted under 35 U.S.C. 154(b) by 94 days.

(21) Appl. No.: 14/505,848

(22) Filed: Oct. 3, 2014

(65) Prior Publication Data
US 2015/0099207 A1 Apr. 9, 2015

(30) Foreign Application Priority Data

Oct. 4, 2013 (JP) .................................. 2013-209480
Sep. 18, 2014 (JP) .................................. 2014-190596

(51) Int. Cl.
| | | |
|---|---|---|
| H01M 4/92 | (2006.01) | |
| H01M 4/86 | (2006.01) | |
| H01M 4/88 | (2006.01) | |
| H01M 8/10 | (2016.01) | |
| H01M 8/1004 | (2016.01) | |
| H01M 4/90 | (2006.01) | |

(52) U.S. Cl.
CPC ......... *H01M 4/928* (2013.01); *H01M 4/8663* (2013.01); *H01M 4/9041* (2013.01); *H01M 4/9091* (2013.01); *H01M 4/921* (2013.01); *H01M 8/1004* (2013.01); *Y02P 70/56* (2015.11)

(58) Field of Classification Search
CPC .. H01M 4/928; H01M 4/8657; H01M 8/1004; H01M 4/8663; H01M 4/8621; H01M 4/921; H01M 4/8875; H01M 4/8892; H01M 2008/1095; H01M 2250/10; H01M 2250/20; H01M 2250/30; H01M 2300/0082
See application file for complete search history.

(56) References Cited

U.S. PATENT DOCUMENTS

| | | | | |
|---|---|---|---|---|
| 2009/0208806 A1* | 8/2009 | Izuhara | .............. | C08G 65/4056 429/450 |
| 2012/0196206 A1* | 8/2012 | Yamaguchi | ............ | C01G 25/00 429/482 |
| 2013/0252134 A1* | 9/2013 | Takami | ............... | H01M 4/8663 429/482 |

FOREIGN PATENT DOCUMENTS

| | | |
|---|---|---|
| JP | 2003221601 | 8/2003 |
| JP | 200634449 | 12/2006 |
| WO | WO 2011/096230 | 8/2011 |

OTHER PUBLICATIONS

Yangchauan Xing, "The Journal of Physical Chemistry B", 2004, 108, p. 19255-19259.
H. Yano et al. "Phys. Chem. Chem Phys.", 2010, 12, p. 3806-3814.
A certificate of the exceptions to lack of novelty of invention No. 1 (Development of Cathode Catalyst of Polymer Electrolyte Fuel Cell using Fept Porous Nanocapsules Sep. 26, 2013).
A certificate of the exceptions to lack of novelty of invention No. 2 (Development of Cathode Catalyst of Polymer Electrolyte Fuel Cell using Fept Porous Nanocapsules Aug. 16, 2013).
A certificate of the exceptions to lack of novelty of invention No. 3 (Development of Cathode Catalyst of Polymer Electrolyte Fuel Cell using Fept Porous Nanocapsules Sep. 27, 2013).
A certificate of the exceptions to lack of novelty of invention No. 4 (Development of Cathode Catalyst of Polymer Electrolyte Fuel Cell using Fept Porous Nanocapsules Sep. 27, 2013).
A certificate of the exceptions to lack of novelty of invention No. 5 (Aug. 26, 2014).
A certificate of the exceptions to lack of novelty of invention No. 6 (Aug. 26, 2014).
A certificate of the exceptions to lack of novelty of invention No. 7 (Aug. 26, 2014).
Notification of Reasons for Refusal issued in counterpart Japanese Patent Application No. 2014-190596, dated Sep. 13, 2016.

* cited by examiner

*Primary Examiner* — Muhammad S Siddiquee
(74) *Attorney, Agent, or Firm* — Seyfarth Shaw LLP

(57) ABSTRACT

Provided is a catalyst layer for gas diffusion electrode that can be used without using carbon supports, a method for manufacturing the same, a membrane electrode assembly, and a fuel cell. The catalyst layer for gas diffusion electrode according to the present invention includes a network-like metallic catalyst formed of a sintered body, the network-like metallic catalyst including nanoparticles linked with each other to have electron conductivity; and an ion conductor, at least a part of the ion conductor contacting the network-like metallic catalyst. Further, the membrane electrode assembly according to the present invention includes a polymer electrolyte membrane provided between an anode catalyst layer and a cathode catalyst layer, and the catalyst layer for gas diffusion electrode stated above is used in at least one of the anode catalyst layer and the cathode catalyst layer.

16 Claims, 19 Drawing Sheets

CATALYST LAYER FOR GAS DIFFUSION ELECTRODE, METHOD FOR MANUFACTURING THE SAME, MEMBRANE ELECTRODE ASSEMBLY, AND FUEL CELL

INCORPORATION BY REFERENCE

This application is based upon and claims the benefit of priority from Japanese patent application No. 2013-209480, filed on Oct. 4, 2013 and Japanese patent application No. 2014-190596, filed on Sep. 18, 2014, the disclosure of which is incorporated herein in its entirety by reference.

BACKGROUND OF THE INVENTION

1. Field of the Invention

The present invention relates to a fuel cell which generates electrical power by use of an electrochemical reaction. The present invention further relates to a membrane electrode assembly, a catalyst layer for gas diffusion electrode and a method for manufacturing the same, preferably applied to a fuel cell or the like.

2. Description of Related Art

A fuel cell is a generator having a structure including a pair of electrodes between which an electrolyte is interposed, one electrode being supplied with fuel and the other electrode being supplied with oxidant, thereby converting chemical energy into electric energy with high efficiency. The fuel cells are classified into, for example, a polymer electrolyte fuel cell, a phosphoric acid fuel cell, a molten carbonate fuel cell, and a solid oxide fuel cell, depending on the type of the electrolyte. Among them, attention has been drawn to the polymer electrolyte fuel cell in terms of the high energy conversion efficiency and the reduction in size, and the polymer electrolyte fuel cell is expected to be applied to, for example, fuel cell vehicles, stationary cogeneration systems, portable power supplies, power supplies for information devices.

The polymer electrolyte fuel cell is classified into a cation exchange type and an anion exchange type depending on the electrolyte. When the cation exchange type electrolyte is used, the environment in the electrodes is acidified. When the anion exchange type electrolyte is used, the environment in the electrodes is alkalified. While being varied depending on the classification of the electrolyte or the feed fuel, a catalyst layer typically contains a metallic catalyst such as platinum or platinum alloy, a carbon powder that supports the metallic catalyst, and an ion conductor.

It is indispensable to improve the performance of the catalyst layer arranged in electrodes (anode and cathode) in order to improve the characteristics of the polymer electrolyte fuel cell. Accordingly, catalyst layers have been energetically researched and developed, and a number of proposals have been made.

Yangchauan Xing, "The Journal of Physical Chemistry B", 2004, 108, p. 19255-19259 proposes an electrode catalyst that uses carbon materials such as carbon nanotubes to support a metallic catalyst in order to improve catalytic activities of an oxidation reaction of hydrogen in the anode and a reduction reaction of oxygen in the cathode. H. Yano et al. "Phys. Chem. Chem. Phys.", 2010, 12, p. 3806-3814 reports that durability is improved by graphitization due to a heat treatment of carbon which is a support body, and the size control of platinum nanoparticles. International Patent Publication No. WO 2011/096230 discloses a technique of using nanoparticles forming a network-like structure and having a hollow inside for a medical agent.

SUMMARY OF THE INVENTION

FIG. 1 shows a schematic partially enlarged explanatory view of a cathode catalyst layer of a polymer electrolyte fuel cell including a catalyst layer that reduces oxygen in the cathode. As shown in FIG. 1, the reduction reaction of oxygen is carried out on platinum particles of, for example, 2 to 3 nm serving as cathode catalysts in the presence of electrons and protons. Carbon particles support metallic catalysts as nanoparticles to increase the surface area of the metallic catalysts. Carbon particles further serve as supports that disperse the metallic catalyst particles to prevent aggregation of the metallic catalyst particles. Carbon particles that serve as supports also carry out an electron conduction as shown in FIG. 1.

However, the carbon supports also become a factor to inhibit gas diffusion. In reality, there is a problem that the gas diffusion rate is lower than the reaction rate in a high current density region in the catalyst layer, which causes a decrease in the performance because gas diffusion is rate-determining step.

While described above is the problem in the electrodes used for polymer electrolyte fuel cells, the similar problem may occur in catalyst layers for gas diffusion electrodes including other fuel cells as well.

The present invention has been made in view of the aforementioned background, and an object of the present invention is to provide a catalyst layer for gas diffusion electrode that can be used without using carbon supports, a method for manufacturing the same, a membrane electrode assembly, and a fuel cell.

As a result of study, the present inventors have found that the problems can be solved by the following aspects and have reached the present invention.

[1] A catalyst layer for gas diffusion electrode including: a network-like metallic catalyst formed of a sintered body, the network-like metallic catalyst including nanoparticles linked with each other to have electron conductivity; and an ion conductor, at least a part of the ion conductor contacting the network-like metallic catalyst.

[2] The catalyst layer for gas diffusion electrode according to [1], in which the network-like metallic catalyst is at least one of a capsule-like catalyst, a rod-like catalyst, and a sheet-like catalyst.

[3] The catalyst layer for gas diffusion electrode according to [1] or [2], in which the network-like metallic catalyst is carbon support free.

[4] The catalyst layer for gas diffusion electrode according to any one of [1] to [3], in which the ion conductor is a cation conductor or an anion conductor.

[5] The catalyst layer for gas diffusion electrode according to [1] or [2], in which the catalyst layer has a thickness of 10 μm or smaller, more preferably 2 μm or smaller, and further preferably 0.5 μm or smaller.

[6] A membrane electrode assembly including a polymer electrolyte membrane provided between an anode catalyst layer and a cathode catalyst layer, the membrane electrode assembly using the catalyst layer for gas diffusion electrode according to any one of [1] to [5] in at least one of the anode catalyst layer and the cathode catalyst layer.

[7] The membrane electrode assembly according to [6], in which the thickness of the catalyst layer for gas diffusion electrode is 10 μm or smaller, more preferably 2 μm or smaller, and further preferably 0.5 μm or smaller.

[8] A fuel cell including the catalyst layer for gas diffusion electrode according to any one of [1] to [5].

[9] The fuel cell according to [8], including: a polymer electrolyte membrane, and an anode unit and a cathode unit that hold the polymer electrolyte membrane, in which the catalyst layer for gas diffusion electrode is arranged in at least one of the anode unit and the cathode unit that contacts with the polymer electrolyte membrane.

[10] A method for manufacturing a catalyst layer for gas diffusion electrode including: a process (a) for forming a template having a desired shape and a first polarity; a process (b) for adsorbing a metal-based nanoparticle on a surface of the template or growing the metal-based nanoparticle in situ, the metal-based nanoparticle having a second polarity opposite from the first polarity and containing a catalyst nanoparticle; a process (c) for performing a sintering process after the process (b) to obtain a network-like metallic catalyst; and a process (d) for incorporating an ion conductor into a catalyst layer so that the ion conductor contacts with the network-like metallic catalyst, in which the ion conductor in the process (d) is at least one of the following (i) to (iii):

(i) a component included in the template incorporated by the process (a);

(ii) obtained by converting a component included in the template after the process (c), the component included in the template being used as a precursor; and (iii) introduced by being newly added after the process (c).

[11] The method for manufacturing the catalyst layer for gas diffusion electrode according to [10], in which: the network-like metallic catalyst is at least one of a capsule-like catalyst, a rod-like catalyst, and a sheet-like catalyst, and the ion conductor is provided inside and/or outside the network-like metallic catalyst.

[12] The method for manufacturing the catalyst layer for gas diffusion electrode according to [10] or [11], in which the sintering process is a supercritical process or a subcritical process.

[13] The method for manufacturing the catalyst layer for gas diffusion electrode according to at least any one of [10] to [12], in which the template consists of a template particle including a surface having a first polarity, the template particle being obtained by modifying a surface of a pre-template particle.

The present invention achieves great effects that it is possible to provide a catalyst layer for gas diffusion electrode that can be used without using carbon supports, a method for manufacturing the same, a membrane electrode assembly, and a fuel cell.

The above and other objects, features and advantages of the present invention will become more fully understood from the detailed description given hereinbelow and the accompanying drawings which are given by way of illustration only, and thus are not to be considered as limiting the present invention.

BRIEF DESCRIPTION OF THE DRAWINGS

FIG. 1A shows CV curves of the samples (Example 1 and Comparative example 1) manufactured according to Electrode example 1;

DESCRIPTION OF THE EXEMPLARY EMBODIMENTS

A catalyst layer for gas diffusion electrode according to the present invention at least includes a network-like metallic catalyst formed of a sintered body, the network-like metallic catalyst including nanoparticles linked with each other to have electron conductivity; and an ion conductor, at least a part of the ion conductor contacting the network-like metallic catalyst, and can be suitably used for a catalyst of a fuel cell or the like. Hereinafter, the catalyst layer for gas diffusion electrode according to the present invention will be described using an example of embodiments in which the catalyst layer for gas diffusion electrode is applied to a polymer electrolyte fuel cell.

First Embodiment

Figure 2:
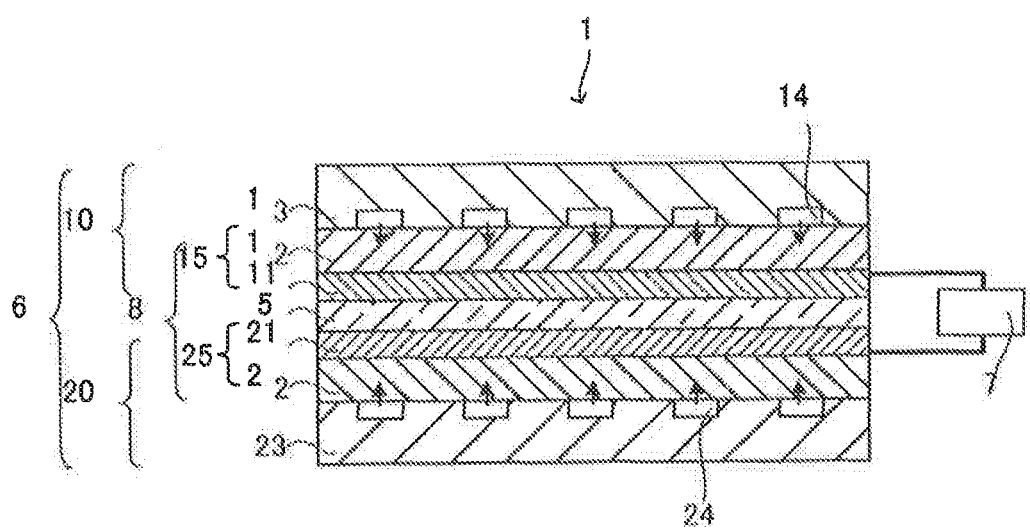
FIG. 2 is a schematic cross-sectional view showing one example of a substantial part of a polymer electrolyte fuel cell according to a first embodiment.

FIG. 2 is a schematic cross-sectional view showing one example of a substantial part of a polymer electrolyte fuel cell according to a first embodiment. A polymer electrolyte fuel cell 1 includes a cell 6 and an external circuit 7. The cell 6 includes a polymer electrolyte membrane 5 having ion conductivity, an anode unit 10 supplied with a fuel gas such as hydrogen, and a cathode unit 20 supplied with oxygen. Cells 6 are normally stacked according to the required output to form a battery.

The anode unit 10 includes an anode catalyst layer 11, a gas diffusion layer 12, and a separator 13 arranged in this order from the side of the polymer electrolyte membrane 5, and the cathode unit 20 includes a cathode catalyst layer 21, a gas diffusion layer 22, and a separator 23 arranged in this order from the side of the polymer electrolyte membrane 5. An electrode that can be concurrently contacted by gas, an electrolyte, and a catalyst layer is referred to as a gas diffusion electrode. In the first embodiment, the anode catalyst layer 11 and the gas diffusion layer 12 serve as a gas diffusion electrode. Further, the cathode catalyst layer 21 and the gas diffusion layer 22 serve as a gas diffusion electrode. As described above, however, it is only required that the gas, the electrolyte, and the catalyst layer can concurrently contact with the gas diffusion electrode, and the gas diffusion layers 12 and 22 may not be used. In summary, the catalyst layer for gas diffusion electrode may be formed only of the anode catalyst layer 11 and/or the cathode catalyst layer 21. Further, a structure in which each catalyst layer of the pair of gas diffusion electrodes is joined with the electrolyte membrane so that the catalyst layers are faced with the electrolyte membrane is referred to as a membrane electrode assembly (MEA) 8. The external circuit 7 is electrically connected to the anode catalyst layer 11 of the anode unit 10, the cathode catalyst layer 21 of the cathode unit 20 and the like.

In the polymer electrolyte fuel cell 1 formed as stated above, a reducing gas such as hydrogen is supplied to the anode catalyst layer 11 from gas flow channels 14 in the separator 13 through the gas diffusion layer 12 in the anode unit 10. Meanwhile, in the cathode unit 20, an oxidizing gas such as oxygen or air is supplied to the cathode catalyst layer 21 from gas flow channels 24 in the separator 23 through the gas diffusion layer 22.

In the cation exchange type that uses a hydrogen gas as a reducing gas and an oxygen gas as an oxidizing gas, an oxidation reaction of hydrogen occurs in the anode catalyst layer 11, which generates hydrogen ions and electrons. The hydrogen ions that are generated move to the cathode catalyst layer 21 through the polymer electrolyte membrane 5 having ion conductivity. Meanwhile, the electrons that are generated move to the cathode catalyst layer 21 via the external circuit 7. The hydrogen ions and the electrons that reach the cathode unit 20 react with oxygen to generate water in the cathode catalyst layer 21. In short, in the cathode catalyst layer 21, a reduction reaction of oxygen occurs. The water generated by the reduction reaction is discharged to outside from the gas diffusion layer 22 of the cathode unit 20, or is supplied to the polymer electrolyte membrane 5. Through the series of reactions, electricity is supplied to the outside.

There is no particular limitation for the polymer electrolyte membrane 5 as long as it is a membrane made of a material capable of transporting ions and having no electron conductivity. Preferably, the polymer electrolyte membrane 5 is, for example, a polyperfluorosulfonic acid resin, a sulfonated polyethersulfonic acid resin, a sulfonated polyimide resin, or sulfuric acid doped polybenzimidazole.

Hereinafter, the catalyst layer for gas diffusion electrode used as the anode catalyst layer 11 and the cathode catalyst layer 21 will be described in detail. The catalyst layer for gas diffusion electrode described below in detail is not necessarily used for both of the anode catalyst layer 11 and the cathode catalyst layer 21 and may be used for at least one of the anode catalyst layer 11 and the cathode catalyst layer 21.

Figure 3:
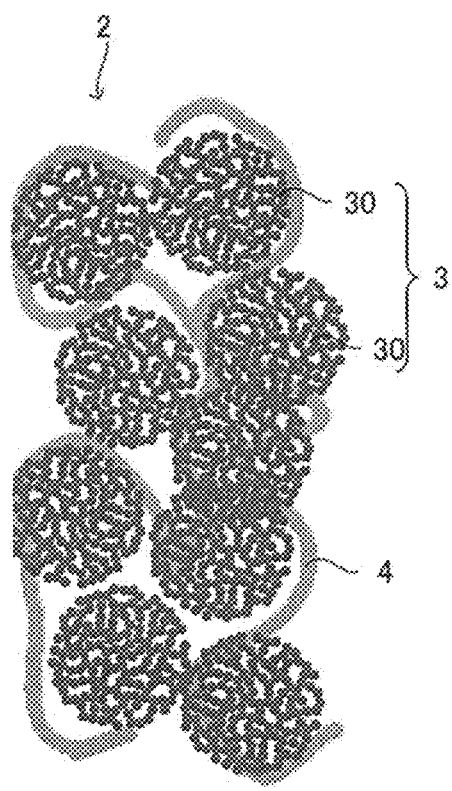
FIG. 3 is a partially enlarged schematic view of a catalyst layer for gas diffusion electrode according to the first embodiment.

FIG. 3 shows a partially enlarged schematic view of the catalyst layer for gas diffusion electrode according to the first embodiment. A catalyst layer for gas diffusion electrode 2 includes a network-like metallic catalyst 3 formed of a sintered body, the network-like metallic catalyst 3 including nanoparticles linked with each other to have electron conductivity; and an ion conductor 4, at least a part of the ion conductor 4 contacting the network-like metallic catalyst 3. The network-like metallic catalyst 3 according to the first embodiment is made of the capsule-like catalysts 30 and is contacted with the ion conductor 4 mainly on the outer surface of the capsule-like catalysts 30. While the contact and/or fuse of the capsule-like catalysts 30 secure the electron conductivity, the capsule-like catalysts 30 are not necessarily joined and/or fused in the example of FIG. 3 since FIG. 3 shows the capsule-like catalysts 30 arranged on one surface for the sake of convenience of description.

Figure 4:
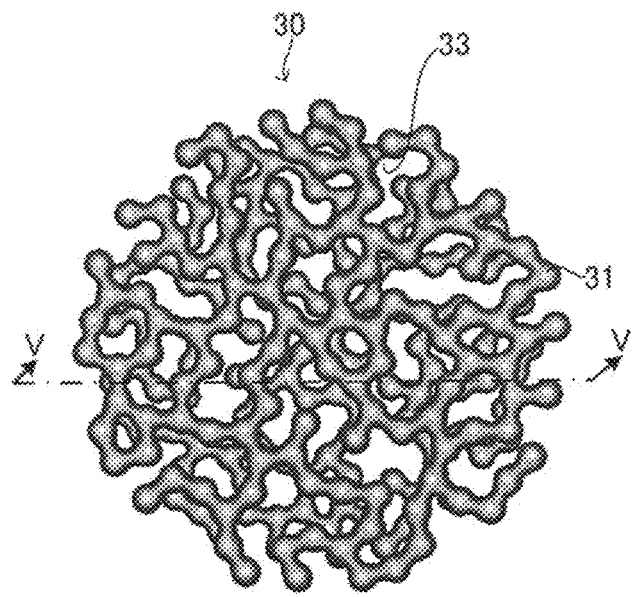
FIG. 4 is a schematic view of a capsule-like catalyst according to the first embodiment.
Figure 5:
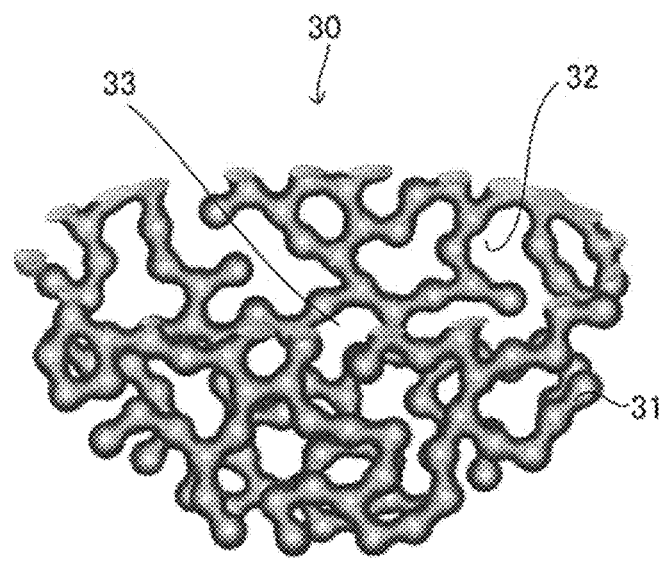
FIG. 5 is a schematic perspective view taken along the V-V line of FIG. 4.

FIG. 4 shows a schematic view of the capsule-like catalyst 30 according to the first embodiment, and FIG. 5 shows a schematic perspective view taken along the line V-V of FIG. 4. The capsule-like catalyst 30 according to the first embodiment has, as shown in FIGS. 4 and 5, a shell forming a substantially spherical net-like skeleton structure 31, and the interior of the net-like skeleton structure 31 is formed as a hollow structure 32. The net-like skeleton structure 31 has a network-like structure in which metals are fused and has electron conductivity.

A number of voids 33 are formed in the net-like skeleton structure 31. The voids 33 are formed to communicate the inside and the outside of the capsule-like catalyst that defines the contour. The porosity of the net-like skeleton structure 31 is not particularly limited. It is only required that the porosity of the net-like skeleton structure 31 is in a range that is able to maintain the net-like skeleton structure and to secure the electron conductivity, and may be designed as appropriate depending on the application or requested needs. When a large amount of catalysts is required, the porosity may be, for example, about 1%. When the strength of the net-like skeleton structure is high, the porosity may be, for example, about 90%.

While the thickness of the shell of the capsule-like catalysts 30 is not particularly limited, it is preferably within a range from 2 nm to 50 nm. By forming the capsule-like catalysts 30 to have the thickness of 2 nm or more, the capsule-like catalysts 30 may be manufactured stably while suppressing structural defects. The shape of the network-like metallic catalyst 3 is not particularly limited and may be freely designed by controlling the shape of templates that will be described below. The shape of the network-like metallic catalyst 3 may be, for example, an elliptical shape, a cylindrical rod-like shape as described in a third embodiment below, a sheet-like shape as in a fifth embodiment, or a helical shape. The network-like metallic catalyst 3 may have a single shape or two or more shapes.

The material of the network-like metallic catalyst 3 is not limited as long as the network-like metallic catalyst 3 is metal-based nanoparticles capable of forming a sintered body and partially containing metal that can serve as a catalyst of the electrode. Metal that can serve as a catalyst of the electrode may be a known one. The metal may be used, for example, platinum, cobalt, nickel, palladium, iron, silver, gold, copper, ruthenium, iridium, molybdenum, rhodium, chromium, tungsten, manganese, a metal compound thereof, and fine particles made of alloy including two or more of these metals. Among them, platinum or platinum alloy such as platinum-iron alloy, platinum-cobalt alloy, platinum-nickel alloy, platinum-iron-cobalt alloy is often used. Iron-cobalt alloy, cobalt-nickel alloy, iron-nickel alloy, iron-cobalt-nickel alloy or the like may be used.

In order to improve the durability such as dissolution properties of the capsule-like catalysts 30, it is preferable to include iron or the like so that the capsule-like catalysts 30 are made with a superlattice structure such as an fcc ordered structure or an fct ordered structure. The capsule-like catalysts 30 that form the catalyst layer for gas diffusion electrode 2 may either have a single structure or consist of two or more structures.

The particle diameter of the capsule-like catalysts 30 is not particularly limited and may be selected as appropriate depending on the application of the capsule-like catalysts 30. The particle diameter of the capsule-like catalysts 30 may easily be controlled by controlling the size of the template particles described below. Considering the size of pre-template particles described below, the particle diameter of the capsule-like catalysts 30 is typically 10 nm or more.

In the catalyst layer for gas diffusion electrode 2, the capsule-like catalysts 30 having different particle diameters may be mixed.

While the thickness of the catalyst layer for gas diffusion electrode may be designed as appropriate depending on the application of the catalyst layer for gas diffusion electrode, it is preferable to reduce the thickness of the catalyst layer for gas diffusion electrode to improve the efficiency of the gas diffusion properties. Although the thickness of the catalyst layer for gas diffusion electrode of various fuel cells such as a fuel cell of a liquid fuel system (e.g., direct methanol fuel cell) and a fuel cell of a gas fuel system (e.g., hydrogen/oxygen fuel cell) can vary depending on the type of the fuel cell or the type of the catalyst to be used, the thickness is preferably 10 µm or smaller. In particular, in the hydrogen/oxygen fuel cell and the like, the thickness of the catalyst layer for gas diffusion electrode is preferably 2 µm or smaller, and more preferably, 0.5 µm or smaller in order to improve the gas diffusion properties for higher efficiency.

The ion conductor 4 is not limited as long as it shows ion conductivity, and may be a known one. In the case of a cation conductor, a proton conductor that conducts hydrogen ions is typically used. In the case of an anion conductor, a hydroxide ion conductor that conducts hydroxide ions is typically selected. As the ion conductor 4, resin including ion-conducting groups or the like may be suitably used. The ion conductor 4 may be, for example, polymers obtained by introducing sulfonic acid groups or anion-exchange groups into fluorocarbon-based or hydrocarbon-based polymers, an inorganic proton conductor such as zirconium compounds having acidic functional groups, an inorganic anion conductor such as layered double hydroxide. The acidic functional groups may include sulfonic acid groups, sulfo groups, sulfonyl groups, phosphoric acid groups, and the zirconium compounds may include zirconium sulfate, zirconium sulphophenyl phosphonic acid, zirconium phosphate, and zirconia sulfate. The polymers having sulfonic acid groups include, for example, perfluorosulfonic acid polymer (Nafion (registered trademark), Flemion (registered trademark), Aciplex (trade name), etc.), SPES: sulfonated polyether sulfone, SPEEK: sulfonated polyetherether ketone, and SPEK: sulfonated polyether ketone.

The amount of the ion conductor contained in the catalyst layer for gas diffusion electrode is not particularly limited as long as the ion conductivity can be secured and the electrical resistance value is not too large. The catalyst layer for gas diffusion electrode may contain other components than the ion conductor and may contain, for example, a binder.

Since the metals are fused on the capsule surface in the capsule-like catalysts 30, the capsule-like catalysts 30 have the electron conductivity. The electron conductivity of one capsule and another capsule may be secured, for example, by (1) a method for contacting the capsule-like catalysts 30 to secure the electron conductivity, (2) a method for linking the capsule-like catalysts 30 so that particles of the capsule-like catalysts 30 are fused, and/or (3) a method for adding other conductivity particles in order to support the conductivity between particles of the capsule-like catalysts 30. The method (1) includes, for example, a method for applying an appropriate pressure from the upper side and the lower side of the thickness direction when the membrane electrode assembly is formed. It is preferable to perform hot pressing at an appropriate temperature. The method (2) includes a method for forming the capsule-like catalysts 30 to have a desired shape in a sintering process that will be described below, or a method for contacting the capsule-like catalysts 30 so that the particles of the capsule-like catalysts 30 are fused at a process for forming a sintered body. The method (3) includes a method for adding conductivity particles such as conductivity carbon. In this case, particles having an appropriate particle diameter are preferably selected so as not to inhibit the gas diffusion. Particles having a particle diameter smaller than that of the capsule-like catalysts 30 or porous carbon particles having excellent gas flow properties may be used. The methods (1) to (3) may be used sorely or in combination with each other.

Next, one example of a method for manufacturing the catalyst layer for gas diffusion electrode according to the first embodiment will be described. However, the catalyst layer for gas diffusion electrode according to the present invention may be manufactured by various methods and is not limited to the following manufacturing method.

The catalyst layer for gas diffusion according to the first embodiment is manufactured by the following processes:

a process (a) for forming a template having a desired shape and a first polarity;

a process (b) for adsorbing metal-based nanoparticles on a surface of the template or growing the metal-based nanoparticles in situ, the metal-based nanoparticles having a second polarity opposite from the first polarity and containing catalyst nanoparticles;

a process (c) for performing the sintering process to obtain a network-like metallic catalyst; and a process (d) for incorporating an ion conductor into the catalyst layer so that the ion conductor contacts with the network-like metallic catalyst. The ion conductor in the process (d) is at least one of the following (i) to (iii):

(i) a component included in the template incorporated by the process (a);

(ii) obtained by converting a component included in the template after the process (c), the component included in the template being used as a precursor;

(iii) introduced by being newly added after the process (c).

Figure 6:
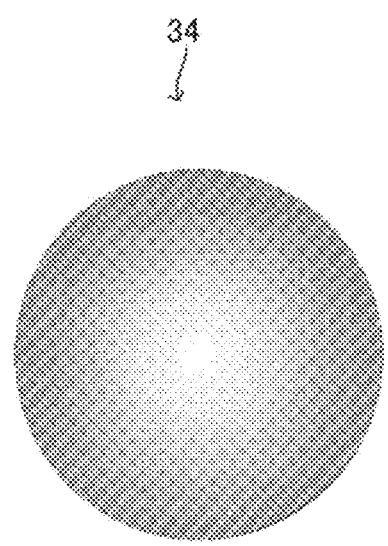
FIGS. 6 to 9 are explanatory views showing processes for manufacturing the catalyst layer for gas diffusion electrode according to the first embodiment.

[Process (a)] An aqueous dispersion of pre-template particles 34 (see FIG. 6) is prepared. The materials suitable for the pre-template particles 34 include, for example, inorganic materials such as silica ($SiO_2$), titanium oxide ($TiO_2$), magnesium fluoride ($MgF_2$), aluminium fluoride ($AlF_3$), lithium fluoride (LiF), sodium fluoride (NaF), aluminium oxide ($Al_2O_3$), zirconium oxide ($ZrO_2$), niobium oxide ($Nb_2O_5$), indium tin oxide (ITO), zinc oxide (ZnO), tin oxide ($SnO_2$), ceria ($CeO_2$), yttrium oxide ($Y_2O_3$), bismuth oxide ($Bi_2O_3$), apatite, and glass. The pre-template particles 34 may be formed of a single material or may be a mixture of a plurality of materials. Alternatively, the pre-template particles 34 may be particles obtained by mixing and kneading two or more materials in advance, afterward granulating, and classifying.

While the method for preparing the pre-template particles 34 is not particularly limited, granulation may be performed using a physical granulation method such as, for example, tumbling granulation, fluid-bed granulation, stirring granulation, disintegration/pulverization granulation, compacting granulation, extrusion granulation, fusion granulation, mixing granulation, spray-cooling granulation, spray drying granulation, precipitation/deposition granulation, freeze drying granulation, suspension flocculation granulation, and descending condensing granulation. The classification is carried out as necessary. When the pre-template particles 34 are commercially available, the commercially-available pre-template particles may be used.

While the range of the particle diameter of the pre-template particles 34 is not particularly limited, it is typically about 10 nm to 10 μm. When the particle diameter exceeds 10 μm, the pre-template particles 34 may not disperse in the solvent. While the shape of the pre-template particles 34 is not particularly limited, the pre-template particles 34 are typically spherical or substantially spherical. The shape of the hollow capsule-like catalysts 30 may be regulated according to the shape of the pre-template particles 34 as described above.

Figure 7:
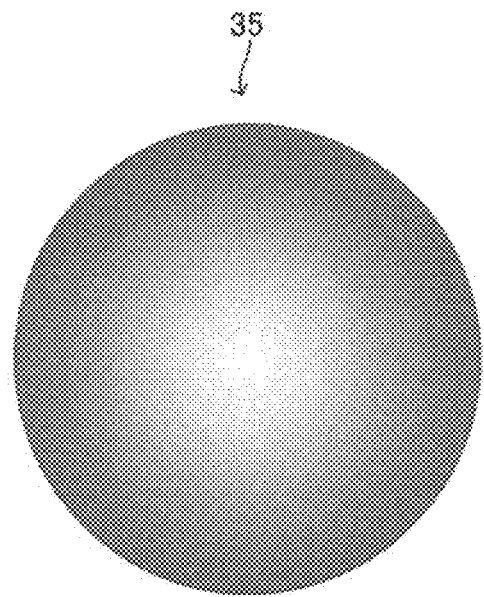

Next, an aqueous dispersion of the template particles 35 (see FIG. 7) obtained by coating the surface of the pre-template particles 34 with a coating layer (not shown) having a first polarity is prepared. Since the template particles 35 are coated with the coating layer, the particle diameter of the template particles 35 is larger than that of the pre-template particles 34. The thickness of the coating layer is not particularly limited and may be set as appropriate without departing from the spirit of the present invention. It is not necessary that the whole surface of the pre-template particles 34 is coated with the coating layer, and the pro-template particles 34 may be partially coated with the coating layer.

While a method for coating the pre-template particles 34 with the coating layer is not particularly limited, a coating method by electrostatic coupling is easy to implement. When the pr-template particles 34 are negatively charged, the pre-template particles 34 may be coated with a coating layer that is positively charged. On the other hand, when the pre-template particles 34 are positively charged, the pre-template particles 34 may be coated with a coating layer that is negatively charged. It is also possible to further coat a coating layer that is negatively charged with a coating layer that is positively charged.

The coating layer is not particularly limited as long as the template particles 35 are able to exhibit the first polarity. The coating layer is preferably an ionic polymer (cationic polymer, anionic polymer). As the ionic polymer, a polymer having functional groups having a charge in a main chain or in a side chain can be used. The ionic polymer that is positively charged typically includes functional groups positively charged or capable of being positively charged such as quaternary ammonium groups and amino groups, and more specifically, polyethylenimine (PEI), polyallylamine hydrochloride (PAH), polydiallyldimethylammonium chloride (PDDA), polyvinylpyridine (PVP), and polylysine. On the other hand, the ionic polymer that is negatively charged typically includes functional groups negatively charged or capable of being negatively charged such as sulfonic acid, sulfuric acid, and carboxylic acid. The ionic polymer that is negatively charged includes, for example, polystyrene sulfonic acid (PSS), polyvinyl sulfate (PVS), dextran sulfate, chondroitin sulfate, polyacrylic acid (PAA), polymethacrylic acid (PMA), polymaleic acid, and polyfumaric acid. The template in the process (a) is formed by these processes.

When the first polarity is plus, the zeta potential of the resultant aqueous dispersion is preferably +5 mV or larger. When the zeta potential is lower than +5 mV, the template particles 35 may be aggregated and precipitated in water. While the upper limit of the zeta potential is not particularly limited, it is typically +80 mV or smaller. On the other hand, when the first polarity is minus, the zeta potential is preferably −5 mV or smaller due to the same reason described above. While the lower limit of the zeta potential is not particularly limited, it is typically −80 mV or larger.

Figure 8:
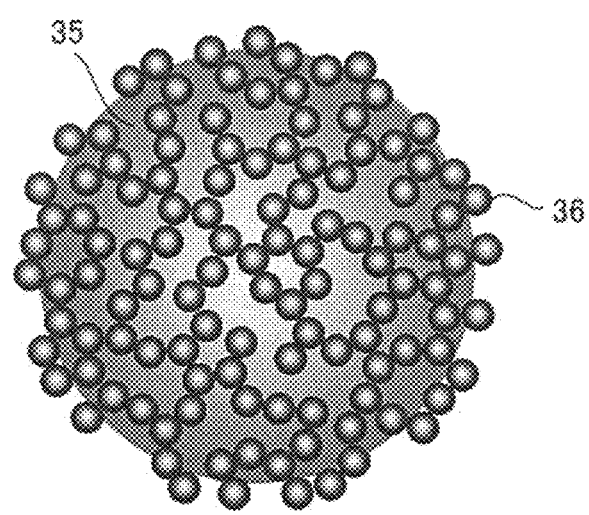

[Process (b)] Next, in order to form the net-like skeleton structure 31 of the capsule-like catalyst 30 on the surface of the template particles 35, the material of the metal-based nanoparticles is adsorbed or grown in situ. Attaching-type catalyst particles 36 (see FIG. 8) are thus obtained. More specifically, solution of materials to form the capsule-like catalysts 30 is added to a homogeneous dispersion of the template particles 35, and the material of the metal-based nanoparticles is adsorbed in the template particles 35 or grown in situ. The metal-based nanoparticles that are added have the polarity opposite from the polarity of the surface of the template particles 35. In short, the metal-based nanoparticles having the second polarity which is opposite from the first polarity, which is the polarity of the surface of the template particles 35, are used.

The shape of the metal-based nanoparticles is not particularly limited, and may be selected from, for example, an amorphous powder, a flat-shaped powder, a spherical powder, a rod-like powder appropriately depending on the application or the purpose of the metal-based nanoparticles. When the metal-based nanoparticles are blended, a plurality of shapes may be mixed. Further, the metal-based nanoparticles may include components removed in the sintering process that will be described below.

While the average particle diameter of the metal-based nanoparticles is not particularly limited, it is preferably 1 nm or larger, and 50 nm or smaller in terms of the improvement of the catalytic activity per specific surface area or per unit mass. The average particle diameter of the metal-based nanoparticles is preferably 25 nm or smaller in order to improve the catalytic activity per specific surface area or per unit mass, and more preferably, 15 nm or smaller. The catalyst nanoparticles are preferably made of a material so that the catalyst ability is high even when the particle diameter of the catalyst nanoparticles is small. The preferable material of the catalyst nanoparticles includes the material of the capsule-like catalyst 30 described above. The preferable range of the average particle diameter of the metal-based nanoparticles other than the catalyst nanoparticles is the same.

Figure 9:
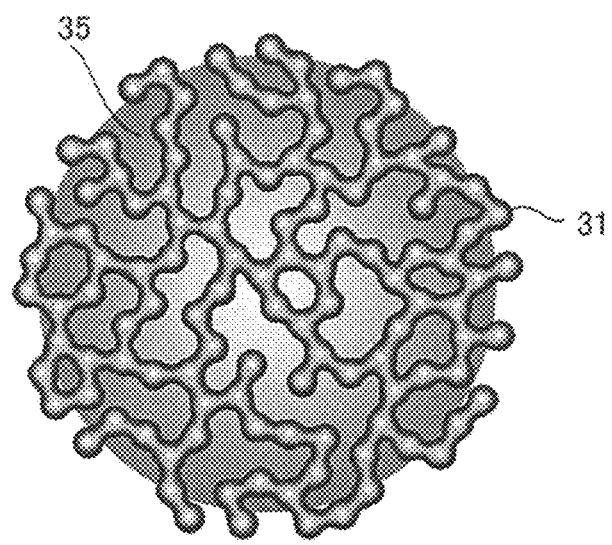

[Process (c)] Next, the attaching-type catalyst particles 36 are converted into a sintered body. The metal-based nanoparticles are adsorbed, or are grown in situ to be fused, thereby obtaining a fused net-like skeleton structure (see FIG. 9). A method for obtaining the sintered body includes a hydrothermal reaction or an alcohol thermal reaction. After the sintering process, the template particles 35 are dissolved, whereby the template particles 35 are removed and the hollow capsule-like catalyst 30 as shown in FIG. 4 is obtained.

A method of the sintering process is not particularly limited as long as metallic network processing can be achieved. The sintering process is preferably performed by a hydrothermal reaction or an alcohol thermal reaction. The hydrothermal reaction or the alcohol thermal reaction is preferably a subcritical state, and more preferably, a supercritical state. The condition of the hydrothermal reaction in the water in the subcritical state or the supercritical state is not particularly limited and depends on the type and the size of the template material and the coverage rate of the nanoparticles in the attaching-type catalyst particles 36. When the silica particles having a particle diameter of about 300 nm are used, the hydrothermal reaction is performed, for example, at 400° C. and 37 MPa for the reaction time of three hours. A method for manufacturing the capsule-like catalysts 30 with a superlattice structure includes a method for including iron in the catalyst nanoparticles to carry out the alcohol thermal reaction.

According to the above processes, the network-like metallic catalyst is obtained. In the first embodiment, in order to make the inside of the resultant capsule-like catalysts 30 hollow, the template is removed using an NaOH aqueous solution or the like.

[Process (d)] The ion conductor is incorporated into the resultant network-like metallic catalyst so that at least a part of the ion conductor is contacted with the network-like metallic catalyst. The ion conductor is preferably inorganic particles described above, an ion conductivity binder such as polymers, or composite materials thereof. The incorporating method includes a method for adding the ion conductor 4 to the network-like metallic catalyst 3 for kneading, and a method for heating and melting the ion conductor 4 to entangle the ion conductor 4 with the network-like metallic catalyst 3. The process (d) is not necessarily carried out after the process (c) and may include a method for incorporating the ion conductor by the above method (i) or (ii) or a method for arbitrarily combining the methods (i) to (iii).

Figure 1:
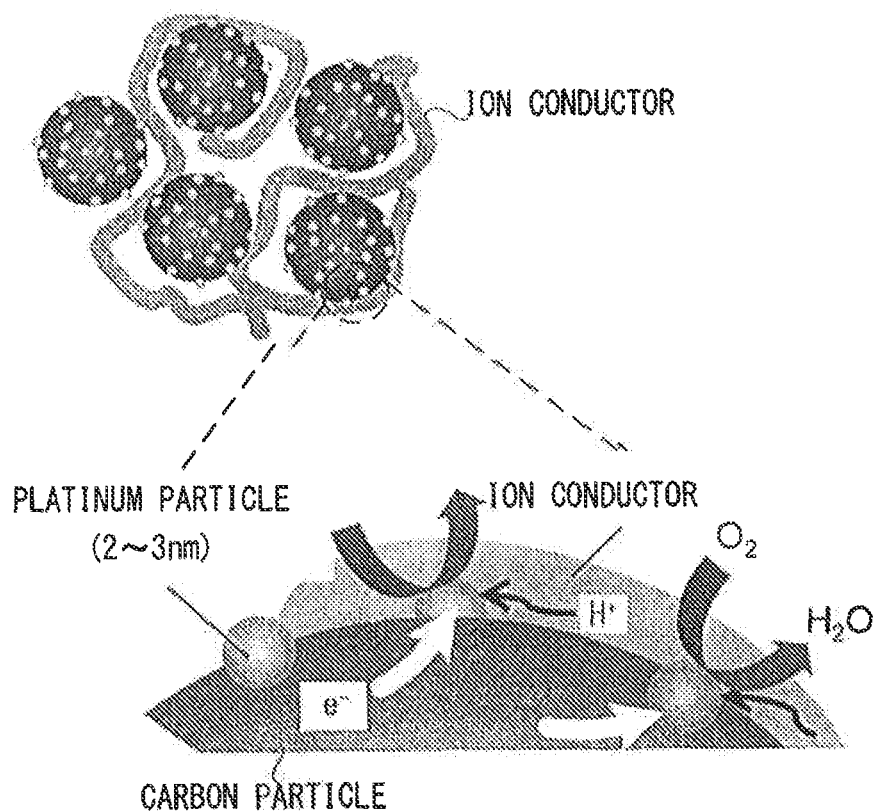
FIG. 1 is a partially enlarged explanatory view of a cathode catalyst layer of a polymer electrolyte fuel cell according to a related art.

According to the catalyst layer for gas diffusion electrode 2 in the first embodiment, the capsule-like catalysts 30 formed by linking nanoparticles in a network manner are used, whereby it is possible to enhance the surface area that can be used as catalysts. It is also possible to secure the electron conductivity without using carbon supports. As shown in the example in FIG. 1, since the carbon supports are not used which are the main cause of an increase in the thickness of the catalyst layer, the thickness of the catalyst layer can be reduced. It is therefore possible to reduce the gas diffusion distance and to improve the gas diffusion rate. Therefore, the present invention is able to solve the problem of the rate-limiting step of gas-diffusion, which is the problem in the high current density region of the catalyst layer using the conventional-type carbon supports, and to achieve high power output. The present invention further provides an advantage that the carbon corrosion does not occur since carbon is not used as supports.

According to the method for manufacturing the catalyst layer for gas diffusion electrode in the first embodiment, the hollow diameter and the particle diameter of the hollow catalyst particles can be easily controlled by controlling the particle diameter, the particle diameter distribution, and the particle shape of the template particles. Further, by including iron or the like, the capsule-like catalysts having the superlattice structure can be easily manufactured. Further, since the process for adding the ion conductor after the capsule-like catalysts are manufactured is employed, the process for manufacturing the capsule-like catalysts and the material of the capsule-like catalysts can be flexibly determined.

Second Embodiment

Next, one example of a catalyst layer for gas diffusion electrode different from that of the first embodiment will be described. The catalyst layer for gas diffusion electrode according to the second embodiment is different from the catalyst layer for gas diffusion electrode according to the first embodiment in that the ion conductor is provided mainly inside the capsule-like catalyst 30. However, the basic structures and the manufacturing method except for the following matters are similar to those of the first embodiment. In the following description, the components same as those in the first embodiment are denoted by the same reference symbols and the descriptions thereof will be omitted as appropriate.

Figure 10:
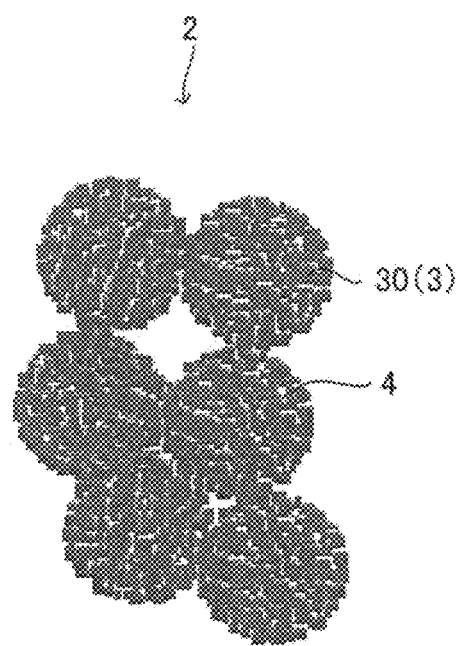
FIG. 10 is a partially enlarged schematic view of a catalyst layer for gas diffusion electrode according to a second embodiment.

FIG. 10 shows a partially enlarged schematic view of the catalyst layer for gas diffusion electrode according to the second embodiment. The catalyst layer for gas diffusion electrode 2 according to the second embodiment mainly includes the ion conductor 4 included in the hollow structure 32 and the voids 33 (see FIG. 5) of the capsule-like catalysts 30 of the network-like metallic catalyst 3.

A method for manufacturing the catalyst layer for gas diffusion electrode according to the second embodiment includes, as is similar to that in the first embodiment stated above, the processes (a) to (d), and the ion conductor in the process (d) is, for example, components that form the template particles and/or the pie-template particles incorporated by the process (a).

In order to contain the ion conductor 4 of the process (d) in the capsule-like catalysts 30, at least one of the components of the template particles and/or the pre-template particles in the process (a) are the ion conductor (method (i)). Preferable examples of the pre-template particles include, for example, an inorganic proton conductor such as zirconium compounds having acidic functional groups such as zirconium sulfate, zirconium sulphophenyl phosphonic acid, zirconium phosphate, zirconia sulfate, and an inorganic anion conductor such as layered double hydroxide. Further, preferable examples when the ion conductor 4 is components of the template particles incorporated by the process (a) includes polymers in which sulfonic acid groups or anion-exchange groups are introduced in the fluorocarbon-based or hydrocarbon-based polymers described in the first embodiment.

In order to contain the ion conductor 4 of the process (d) in the capsule-like catalysts 30, components included in the template may be converted after the sintering process in the process (c) using the template in the process (a) as a precursor (method (ii)). A method for introducing, for example, ion-conducting functional groups (acidic functional groups, anionic functional groups) into the template may be employed.

Further, in order to contain the ion conductor in the process (d) in the capsule-like catalysts 30, another method may be employed that newly adds the ion conductor after the process (c) to introduce the ion conductor into the capsule-like catalysts 30 (method (iii)). When the porosity of the capsule-like catalysts 30 is large, this method is especially effective. The methods (i) to (iii) may be arbitrarily combined.

In the method (i), conditions that do not break the functional groups of the ion conductor are set in the sintering process of the process (c). The ion conductivity and the electron conductivity between particles of the capsule-like catalysts 30 may be secured by carrying out hot pressing or the like when the membrane electrode assembly is manufactured. Alternatively, in the sintering process, at the location where the particles of the capsule-like catalysts 30 contact with each other, catalyst nanoparticles may be fused and linked between particles. It is preferable that the ion conductors are contacted and/or connected between the capsule-like catalysts 30 so that the ion conductivity can be secured between particles.

Shown in FIG. 10 is the example in which the ion conductor 4 is arranged mainly inside the capsule-like catalysts 30. It may also be possible to combine the first embodiment and the second embodiment to form the ion conductor 4 both in the inside and the outside of the capsule-like catalysts 30.

With the catalyst layer for gas diffusion electrode 2 according to the second embodiment, the following effects may be obtained in addition to the effects in the first embodiment. That is, by containing the ion conductor 4 inside the capsule-like catalysts 30, the catalyst layer for gas diffusion electrode 2 can be downsized with high efficiency.

Further, according to the method for manufacturing the catalyst layer for gas diffusion electrode 2 in the second embodiment, the following effects can be obtained in addition to the effects of the first embodiment. That is, according to the method (i), the process for contacting the ion conductor with the capsule-like catalysts after the process (c) can be omitted, whereby the manufacturing processes can be reduced. Further, according to the method (ii), the sintering process is performed before the ion-conducting functional groups are introduced, whereby it is possible to select the sintering process condition and the material more flexibly compared to the method (i).

Third Embodiment

A catalyst layer for gas diffusion electrode according to a third embodiment is different from those of the aforementioned embodiments that use the capsule-like catalysts 30 in that the network-like metallic catalyst 3 is formed of a rod-like catalyst. However, the basic configurations are the same as those of the second embodiment.

Figure 11:
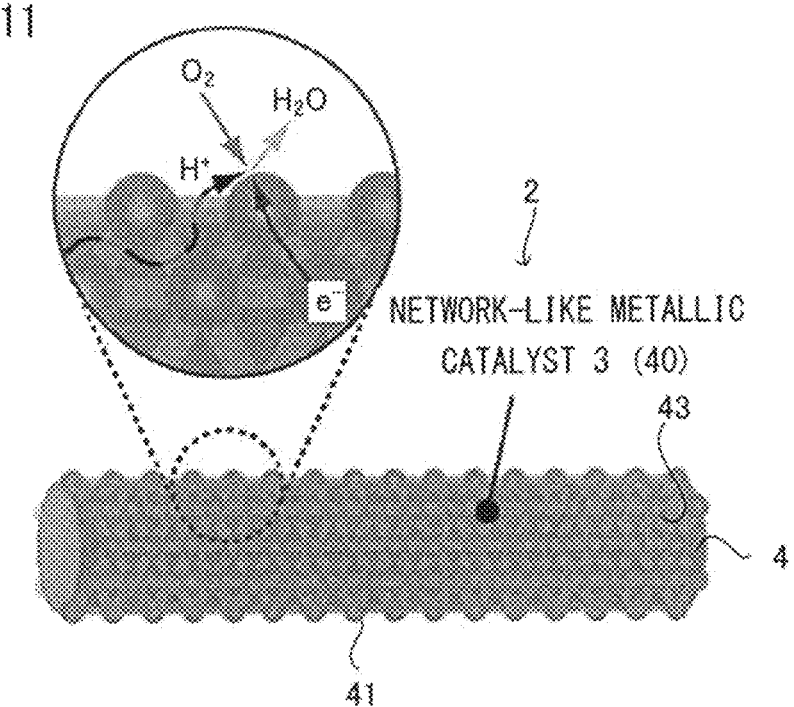
FIG. 11 is a partially enlarged schematic view of a catalyst layer for gas diffusion electrode according to a third embodiment.
Figure 12:
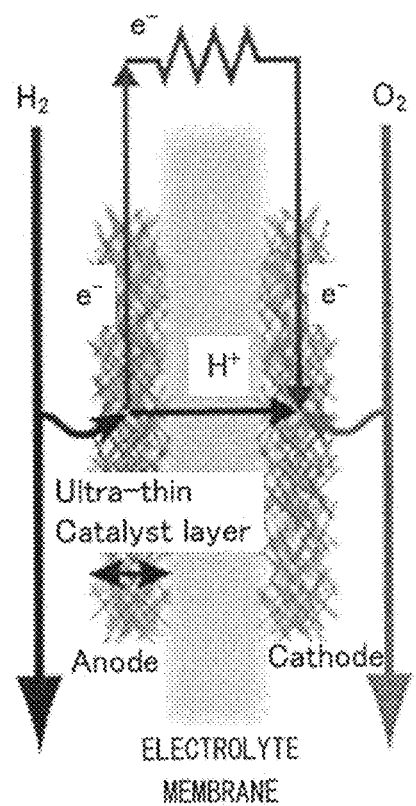
FIG. 12 is schematic explanatory views of an MEA according to the third embodiment.

FIG. 11 shows a partially enlarged view schematically showing the catalyst layer for gas diffusion electrode 2 according to the third embodiment, and FIG. 12 shows a schematic view of the catalyst layers for gas diffusion electrode according to the third embodiment and an electrolyte membrane held therein. The catalyst layer for gas diffusion electrode 2 includes, as shown in FIGS. 11 and 12, a rod-like catalyst 40 and an ion conductor 4.

The rod-like catalyst 40 forms, as shown in FIG. 11, a substantially tubular net-like skeleton structure 41, and the ion conductor 4 is arranged therein. The net-like skeleton structure 41 has a network-like structure in which metals are fused, and has electron conductivity.

A number of voids 43 are formed in the net-like skeleton structure 41, and the voids 43 are formed to communicate the inside and the outside of the rod-like catalyst that defines the contour. The preferable range of the porosity of the net-like skeleton structure 41 is similar to that in the first embodiment. While FIG. 11 shows an example of one rod-like catalyst layer for gas diffusion electrode 2, a plurality of rod-like catalysts 40 actually form a sheet-like structure.

While the thickness of the shell of the rod-like catalyst 40 is not particularly limited, it is preferably in a range from 2 nm to 50 nm. By forming the rod-like catalyst 40 to have a thickness of 2 nm or larger, the rod-like catalyst 40 may be stably manufactured while suppressing the structural defect. The length and the shape of the rod-like catalyst 40 are not particularly limited, and may be designed as appropriate by controlling the shape of the template.

The ion conductor 4 is preferably formed not only inside the rod-like catalyst 40, but is successively formed also in the voids 43 formed in the net-like skeleton structure 41 of the rod-like catalyst 40 or in the outside of the rod-like catalyst 40 in order to achieve excellent ion conductivity in the catalyst layer.

The preferable material of the rod-like catalyst 40 and the ion conductor 4 may be similar to those in the first embodiment. The length of the rod-like catalyst 40 and the diameter of a cut end face of the rod-like catalyst 40 are not particularly limited and may be designed as appropriate depending on the application of the rod-like catalyst 40. The shape and the size of the rod-like catalyst 40 can be easily controlled by controlling the shape and the size of the template. It is possible to connect a plurality of rod-like catalysts 40 having an end face diameter of about 5 nm to 1 µm in the same direction or randomly arrange the plurality of rod-like catalysts 40. The rod-like catalysts may either be a single layer or a multilayer. When the multilayer is used, the plurality of layers may be arranged so that the layers extend in different directions in order to increase the strength. Further, the longitudinal direction of the rod-like catalyst 40 may be, for example, horizontally aligned, vertically aligned, or randomly aligned with respect to the principal surface of the polymer electrolyte membrane 5. It is also possible to use the rod-like catalyst 40 and the capsule-like catalyst 30 according to the first embodiment in combination with each other.

With the catalyst layer for gas diffusion electrode 2 according to the third embodiment, it is possible to obtain the effects similar to those in the embodiments described above. Further, by use of the rod-like catalyst 40 which is formed of nanoparticles in a network manner, it is possible to improve the mechanical strength while increasing the surface area that can be used as catalysts. Further, since the catalysts are linked in a rod-like manner, more stable electron conductivity can be secured.

Fourth Embodiment

A catalyst layer for gas diffusion electrode according to a fourth embodiment is different from the catalyst layer for gas diffusion electrode according to the third embodiment in that an ion conductor is arranged outside of the rod-like catalyst. The basic configurations and the manufacturing method except for the following matters are similar to those in the third embodiment.

In the catalyst layer for gas diffusion electrode according to the fourth embodiment, the ion conductor is mainly arranged outside of the rod-like catalyst of the network-like metallic catalyst so as to entangle with the network-like metallic catalyst. Since the ion conductor in the process (d) is arranged outside of the rod-like catalyst, it is possible to easily manufacture the catalyst layer for gas diffusion electrode by incorporating the ion conductor into the rod-like catalyst after the process (c).

With the catalyst layer for gas diffusion electrode according to the fourth embodiment, the effects similar to those in the third embodiment may be obtained. Further, since the ion conductor is incorporated after the process (c), it is possible to enhance the process margin of the sintering process or the material selectivity of the template.

Fifth Embodiment

A catalyst layer for gas diffusion electrode according to a fifth embodiment is different from those of the above exemplary embodiments in that the network-like metallic catalyst 3 is sheet-like catalysts. The basic configurations and the manufacturing method except for the following matters are similar to those of the embodiments described above.

Figure 13:
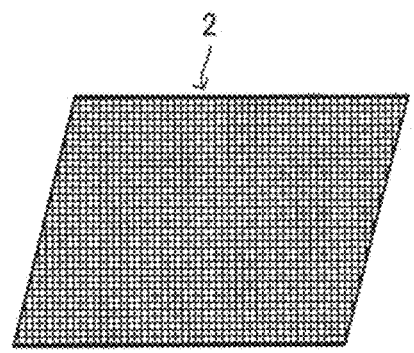
FIG. 13 is schematic explanatory views of a catalyst layer for gas diffusion electrode according to the fifth embodiment.

FIG. 13 shows a schematic view of the sheet-like catalyst layer for gas diffusion electrode 2 according to the fifth embodiment. The catalyst layer for gas diffusion electrode 2 according to the fifth embodiment includes a network-like metallic catalyst and an ion conductor successively arranged in a sheet-like form in the plane and in the thickness directions. In summary, the network-like metallic catalyst formed of sheet-like catalysts forms a net-like sheet structure. Further, metals are fused in the network-like metallic catalyst, leading to electron conductivity. The ion conductors are dispersed so as to contact with the sheet-like catalysts. The thickness of the sheet-like catalysts is not particularly limited and may be designed as appropriate depending on the application or the performance required. The thickness of the sheet-like catalysts is preferably 10 µm or smaller, more preferably, 2 µm or smaller, and further preferably, 0.5 µm or smaller. By decreasing the thickness of the sheet-like catalysts, it is possible to suppress the structural defect and to stably manufacture the sheet-like catalysts.

One method for obtaining the sheet-like network-like metallic catalyst is using a film or a sheet whose surface has a first polarity as a template, impregnating the film or the sheet with catalyst nanoparticles having a second polarity to absorb metal-based nanoparticles or grow metal-based nanoparticles in situ, and then the metal-based nanoparticles are sintered. While the film or the sheet whose surface has the first polarity is not limited without departing from the spirit of the present invention, nonwoven fabric may be used as a preferable example.

While the material of the nonwoven fabric is not particularly limited without departing from the spirit of the present invention, silica fibers, zirconia fibers or the like are preferable as an example. In this case, nonwoven fabric is used as a template, surface treatment is performed so that the nonwoven fabric has the first polarity, metal-based nanoparticles that contain the catalyst nanoparticles having the second polarity are then adsorbed or grown in situ, and then the sintering process is performed. The ion conductor 4 may be incorporated in the catalyst layer by a method (i) for incorporating ion-conducting functional groups or the like in the silica fibers or the zirconia fibers in advance, and/or a method (ii) for incorporating, after the sintering process, ion-conducting functional groups in these fibers.

Further, a material that can be removed in or after the sintering process may be used as the nonwoven fabric. In this case, the ion conductor 4 is entangled with the resultant sheet-like network-like metallic catalyst, thereby obtaining the catalyst layer for gas diffusion electrode.

According to the method of the fifth embodiment, it is possible to simplify the process for forming the catalyst layer for gas diffusion electrode. Since the network-like metallic catalysts are constructed in a sheet-like form, it is possible to enhance the electron conduction efficiency and the surface area. It is also possible to reduce the thickness of the catalyst layer for gas diffusion electrode.

The first to fifth embodiments have been described above. Other embodiments may naturally be included in the scope of the present invention without departing from the spirit of the present invention. Further, the above embodiments may be suitably combined. While described above is the example of applying the catalyst layer for gas diffusion electrode according to the present invention to a polymer electrolyte fuel cell, the catalyst layer for gas diffusion electrode may be suitably applied to various types of fuel cells. The catalyst layer for gas diffusion electrode according to the present invention may be applied not only to the fuel cells but to other applications in which the catalyst layer for gas diffusion electrode is used. While the catalyst layer for gas diffusion electrode according to the present invention may be used without using the carbon supports as described above, the carbon supports may naturally be used.

EXAMPLES

Hereinafter, the present invention will be described further in detail with reference to Examples. Note that the present invention is not limited to the following examples.

Example 1

The template particles having a positive zeta potential were prepared according to the following method. First, 0.16 g of silica particles (diameter of 0.30 μm) that are pre-template particles and 5 mL of deionized water were put into a 30 mL beaker, and then silica particles were dispersed in the beaker.

Next, 12.0 g of 35 wt % poly(diallyldimethylammonium chloride) (hereinafter abbreviated as "PDDA") aqueous solution and 19 g of deionized water were put into a centrifuge tube. This tube was irradiated with ultrasonic waves for ten minutes to dissolve PDDA. Further, the beaker in which silica particles were dispersed was irradiated with ultrasonic waves for 10 minutes, and then both solutions were mixed. The mixture was centrifuged for 10 minutes at 25° C. and rotational speed of 10,000 rpm, the supernatant solution was discarded and the residual solution was washed with deionized water. This process was repeated three times for purification. An aqueous dispersion of PDDA coated silica particles (template particles) dispersed in deionized water was therefore obtained. Hereinafter, the PDDA coated silica particles prepared in this way will be expressed as "PDDA/$SiO_2$—OH".

Figure 14A:
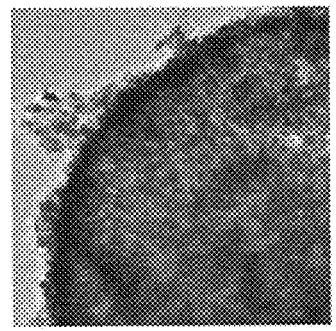
FIG. 14A is a transmission electron microscope image of FePt nanoparticles-adsorbed-PDDA-coated-silica particles (FePt-PDDA-silica particles) according to Example 1.

Then, FePt nanoparticles-adsorbed-PDDA-coated-silica particles (FePt-PDDA-silica particles) were synthesized. Hundred mL of tetraethylene glycol (manufactured by Sigma-Aldrich) and the PDDA/$SiO_2$—OH aqueous dispersion obtained in the above processes were added to a 200 mL recovery flask so that the dry mass of PDDA/$SiO_2$ becomes 0.08 g, and then water was removed by evaporation. The content in the flask was moved to a 200 mL three-necked flask, in which 0.15 g (0.42 mmol) of iron acetylacetonate (III) and 0.1512 g (0.38 mmol) of platinum acetylacetonate (II) were added, and the mixture was stirred for 24 hours. After that, a set for reflux was assembled, and the mixture was placed under a gas atmosphere of Ar/$H_2$, and then stirred at room temperature for 30 minutes. After that, the temperature was raised to 503 K at 10 K/min, and was heated at 503 K for two hours. After the mixture was cooled to the room temperature, brown supernatant solution was discarded and the residual solution was washed with ethanol. This process was repeated for five times. Then a drying step was performed, and particles were obtained. FIG. 14A shows a transmission electron microscope image (Hitachi H7100 transmission electron microscope) of the FePt-PDDA-silica particles.

Figure 14B:
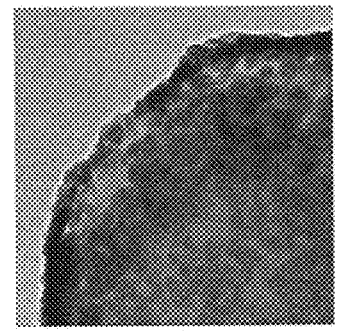
FIG. 14B is a transmission electron microscope image of FePt nanoparticles-silica particles according to Example 1.

The dispersion of the resultant FePt-PDDA-silica particles in ethanol was prepared, subjected to ultrasonic treatment for 10 minutes, and re-dispersed. Five mL of the resultant dispersion was put into a sealed supercritical reaction cell TSC-0011 (volume: 11 mL) manufactured by Taiatsu Techno Corp., degassed by Ar/$H_2$, and sealed by a torque wrench. The sealed reaction cell was put in an electric furnace which had been heated to 290° C. in advance, and was heated under a pressure of about 25 MPa for 3.5 hours. The reaction cell was then put into a water tank, and was rapidly cooled. After leaving the reaction cell for one to two hours, the reaction cell was opened, and was subjected to ultrasonic treatment for 10 minutes and was centrifuged (25° C., 6,000 rpm, 10 minutes). FIG. 14B shows a transmission electron microscope image of the FePt nanoparticles-silica particles. It is seen from FIG. 14B that metallic particles are enlarged and the network among metals is enhanced.

After that, the mixture was dispersed in 3M NaOH aqueous solution, and the solution was stirred at 80° C. for one hour, whereby silica particles were dissolved. After that, the mixture was subjected to centrifugation (25° C., 6,000 rpm, 10 minutes). Then the supernatant solution was discarded and the residual solution was cleaned by deionized water. This process was repeated several times for purification. Then a drying step was performed, and a FePt-capsule-like catalyst was obtained.

Figure 14C:
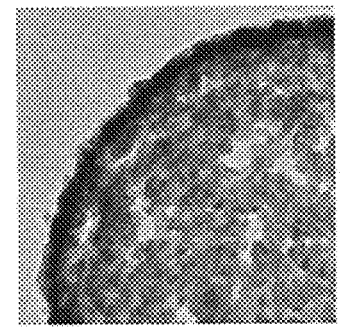
FIG. 14C is a transmission electron microscope image of FePt-capsule-like catalysts according to Example 1.

FIG. 14C shows a transmission electron microscope image at 100 keV of the FePt-capsule-like catalyst. FIG. 14C shows that core silica particles are dissolved and removed. FIG. 14C further shows that the FePt nanoparticles are fused and the capsule-like catalysts 30 made of metallic crystal whose surface has voids are formed. The resultant capsule-like catalysts are hollow capsules having an average particle diameter of about 300 nm, average shell thickness of 5-10 nm, and pore diameter of about 10 mm.

Figure 15:
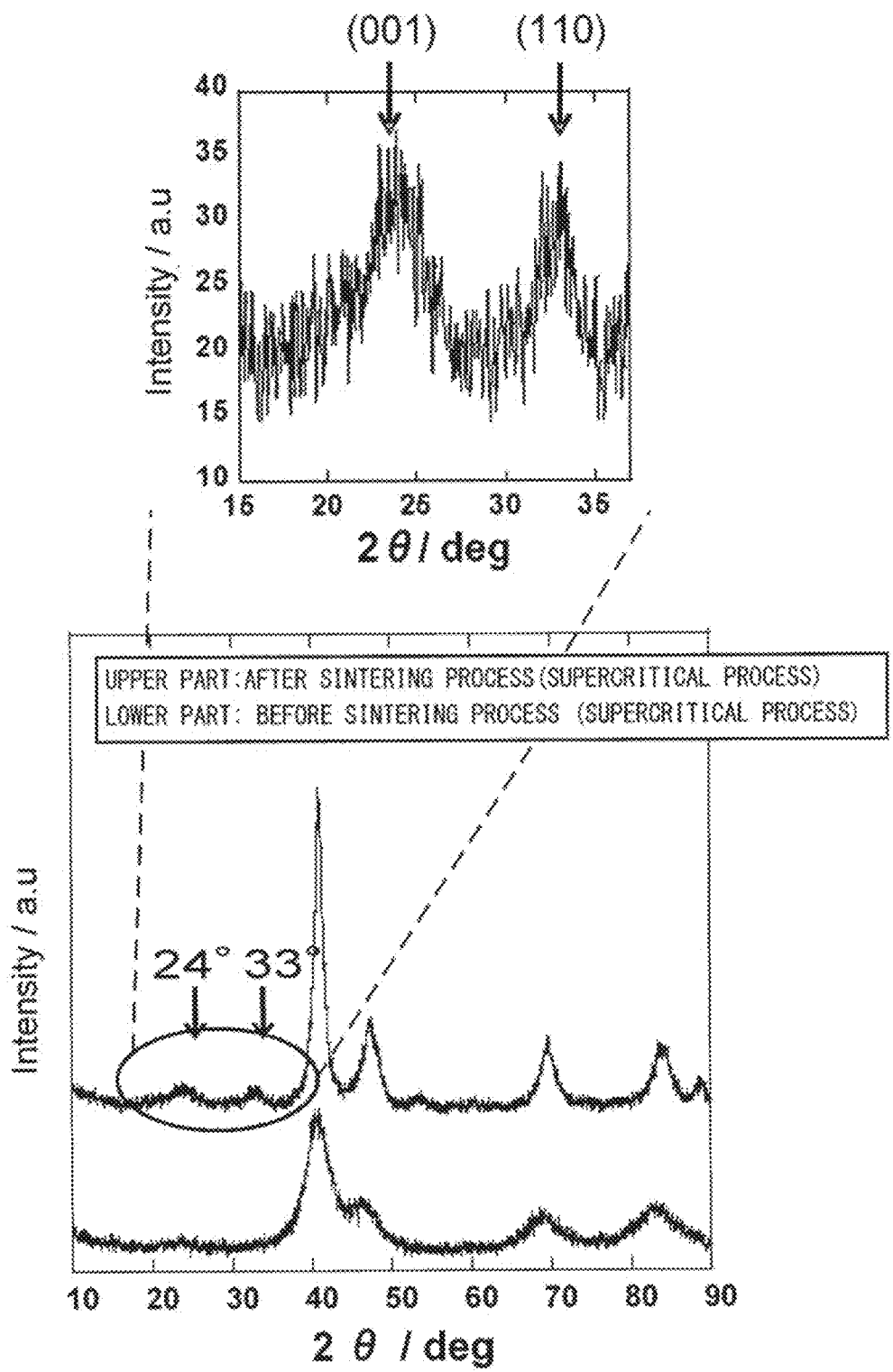
FIG. 15 is a view showing XRD measurement results of a powder sample according to Example 1.

An XRD (RINT2000, manufactured by Rigaku) measurement of the powder sample in Example 1 was carried out (diffraction angle range: 2θ=2-90°, scanning speed: 2θ=2°/min). FIG. 15 shows the results. The capsule-like catalysts after sintering process in Example 1 have, as shown in FIG. 15, clear peaks that exhibit an fct (face-centered tetragonal) ordered structure from peak derived from (001) around 24° and peak derived from (110) around 33° and the c/a value of the catalysts was 0.97. The results show that the capsule-like catalysts in Example 1 have extremely high ordering degree. Further, the peak on the (111) facet around 2θ=40° is shifted to higher angles compared to the peak position on the (111) facet of platinum, which means the alloying takes place. Further, it is confirmed from the results of the ICP measurement that PtFe alloy in the capsule-like catalysts in Example 1 is synthesized with PtFe=0.9:1 (molar ratio). These results show that the PtFe capsule in Example 1 has $L1_0$-type ordered fct structure. Further, the BET specific surface area was 19.94 $m^2$/g.

Example 2

Figure 16:
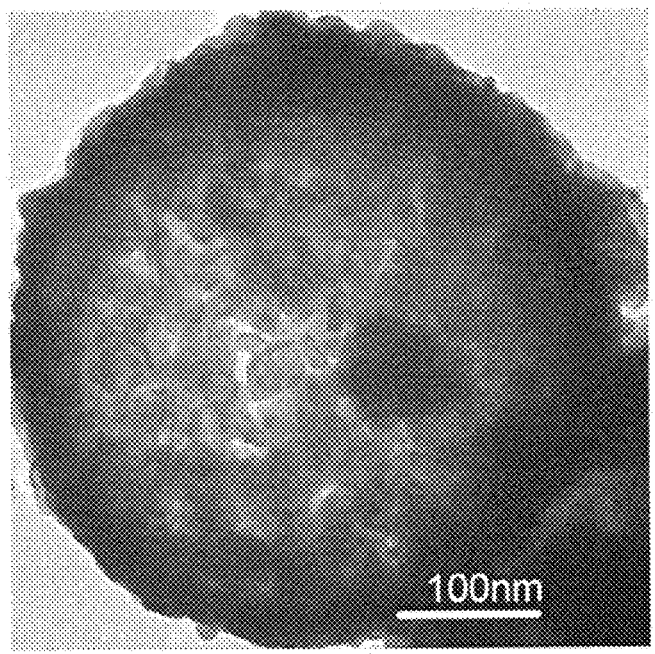
FIG. 16 is a transmission electron microscope image of a Pt-capsule-like catalyst according to Example 2.

Pt capsules were obtained by a method similar to that in Example 1 except that iron acetylacetonate (III) was not added. FIG. 16 shows a transmission electron microscope image of a Pt-capsule-like catalyst. It is seen from FIG. 16 that the core silica particles are dissolved and removed. It is also seen from FIG. 16 that Pt nanoparticles are fused and the capsule-like catalysts 30 whose surface has voids are formed. The resultant capsule-like catalysts 30 are hollow capsules having an average particle diameter of about 300 nm and average shell thickness of about 20 nm.

Figure 17:
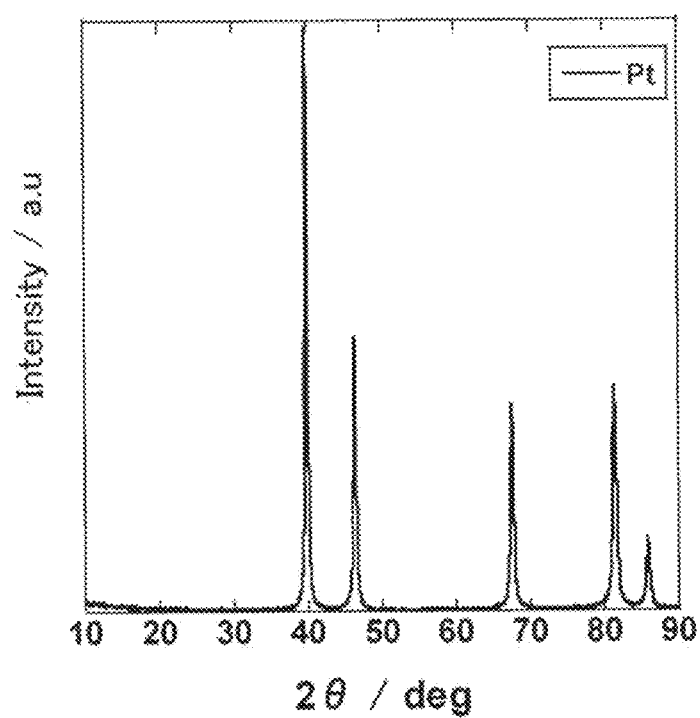
FIG. 17 is a view showing XRD measurement results of a powder sample according to Example 2.

An XRD measurement of the powder sample in Example 2 was conducted in a method similar to that in Example 1. FIG. 17 shows the results. FIG. 17 shows that there is no peak derived from a superlattice structure.

Comparative Example 1

Pt/C (Tanaka Kikinzoku Kogyo, TEC10E50E) was directly used. It is confirmed that an ordered alloy structure is not observed in the catalysts in Comparative example 1.

[Electrochemical Evaluation]

The electrochemical evaluation of the capsule-like catalyst obtained in Example 1 and Pt/C particles in Comparative example 1 was carried out using a rotating disk electrode. When the electrochemical evaluation was carried out, glassy carbon (geometric region: 0.196 $cm^2$) polished by alumina was used.

Electrode Example 1

A catalyst dispersion was manufactured by mixing 6.25 mL of 24% IPA solution in which 5 mg of catalyst was dispersed and 25 μL of perfluorocarbon material (Nafion (registered trademark), 5 wt %). Then, 10 μL of catalyst dispersion was applied to the surface of the glassy carbon and then dried. Through these processes, an electrode in which the catalyst in Example 1 was supported on the glassy carbon and an electrode in which the catalyst in Comparative example 1 was supported on the glassy carbon were manufactured.

Electrode Example 2

An electrode in which the catalyst in Example 1 was supported on the glassy carbon was manufactured in a way similar to that in Electrode example 1 except that the concentration of the IPA solution was 25%, and the amount of catalyst and perfluorocarbon material (Nafion (registered trademark), 5 wt %) added to 6.25 mL of IPA solution was 2.5 mg and 12.5 μL, respectively.

Figure 18A:
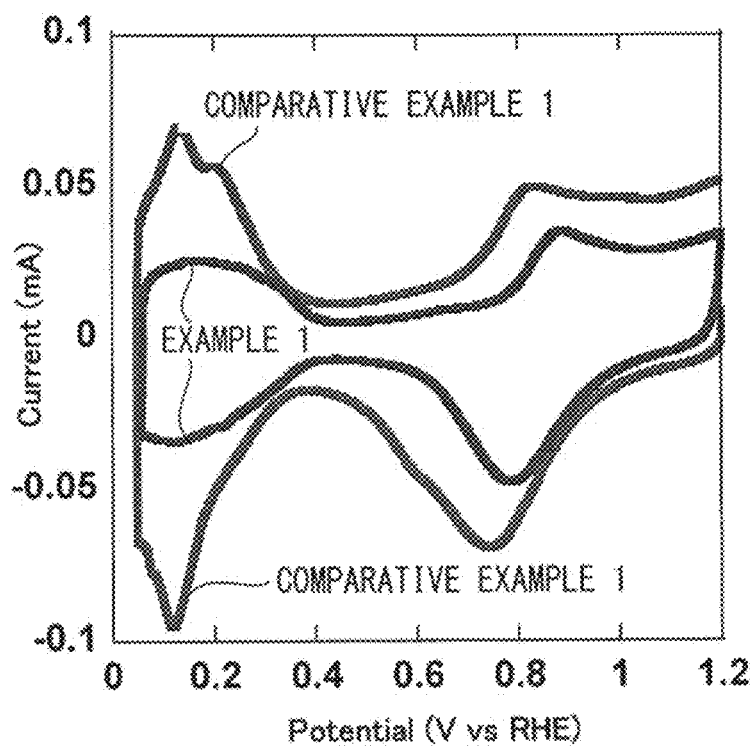
FIG. 18B shows CV curves of the sample (Example 1) manufactured according to Electrode example 2 and the sample (Comparative example 1) manufactured according to Electrode example 1.
Figure 18B:
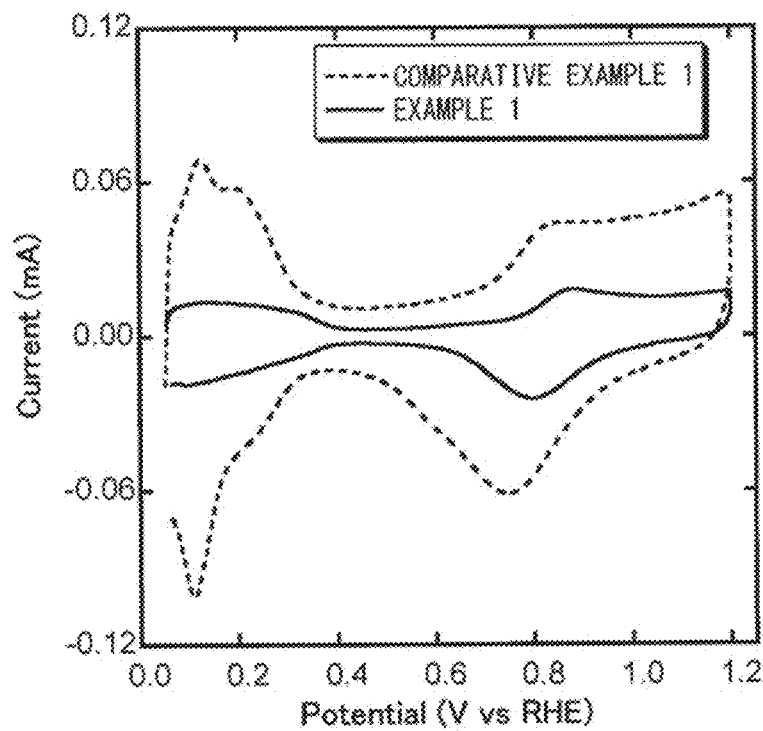

A CV (Cyclic voltammetry) measurement of the catalyst samples in Example 1 and Comparative example 1 was carried out using electrodes obtained in Electrode example 1 and Electrode example 2 as working electrodes, a platinum wire as a counter electrode, and a reversible hydrogen electrode (RHE) as a reference electrode, and an electrochemical surface area (ECSA) was calculated from a hydrogen desorption peak area. The CV measurement was carried out at 0.06-1.2 V, sweep speed of 20 mV/s, and room temperature, using 0.1 M perchloric acid under nitrogen atmosphere as electrolyte. FIG. 18A shows CV measurement results using the working electrode of Example 1 obtained in Electrode example 1, and FIG. 18B shows CV measurement results using the working electrode of Example 1 obtained in Electrode example 2. FIGS. 18A and 18B also show CV measurement results using the working electrode of the Comparative example 1 obtained in Electrode example 1. FIGS. 18A and 18B show that the FePt-capsule-like catalyst in Example 1 gives characteristic responses of platinum. Further, the value of ECSA 20 $m^2/g$ calculated for Example 1 of Electrode example 1 is almost the same as the value of surface area obtained by the BET measurement.

Figure 19A:
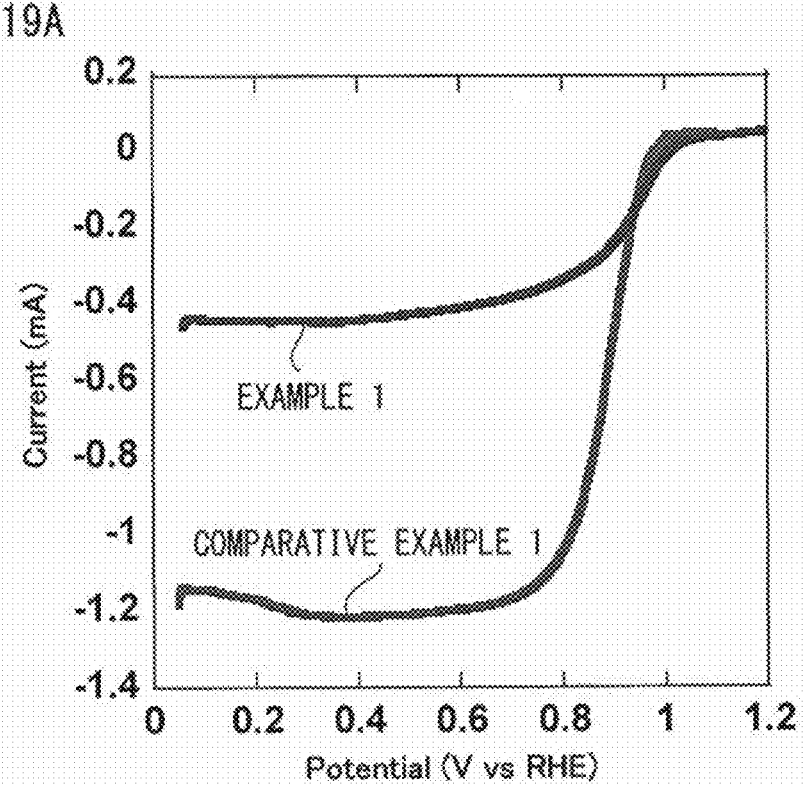
FIG. 19A shows LSV curves of the samples (Example 1 and Comparative example 1) manufactured using Electrode example 1.
Figure 19B:
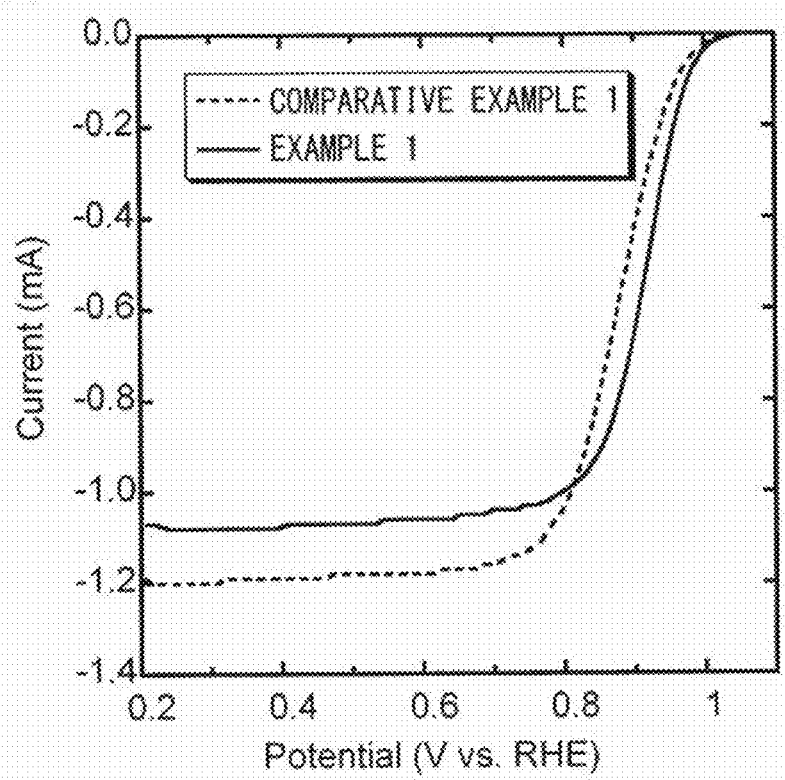
FIG. 19B shows LSV curves of the sample (Example 1) manufactured according to Electrode example 2 and the sample (Comparative example 1) manufactured according to Electrode example 1.

Further, an LSV (Linear sweep voltammetry) measurement of the catalyst samples in Example 1 and Comparative example 1 was carried out under the following conditions to calculate the oxygen reduction reaction activity. At the electrode rotational speed of 1600 rpm, a potential scan was carried out from 0.06 V to 1.2 V at a sweep rate of 20 mV/s, and the oxygen reduction reaction activity per unit mass (mass activity) was evaluated from the kinetic current value at the voltage of 0.9 V. FIG. 19A shows LSV measurement results of Example 1 obtained in Electrode example 1, and FIG. 19B shows LSV measurement results of Example 1 obtained in Electrode example 2. FIGS. 19A and 19B also show LSV measurement results of Comparative example 1 obtained in Electrode example 1. The calculation of the mass activity reveals that Example 1 exhibits the activity comparable to that in Comparative example 1 in Electrode example 1.

On the other hand, in Electrode example 2, Example 1 exhibits the activity higher than that in Comparative example 1. It is revealed that the specific activity is extremely high and is almost ten times larger than that in Comparative example 1. It is considered that the reason that Electrode example 2 shows higher activity compared to Electrode example 1 in Example 1 is that a thin and uniform electrode was formed in Electrode example 2 compared to Electrode example 1.

Figure 20:
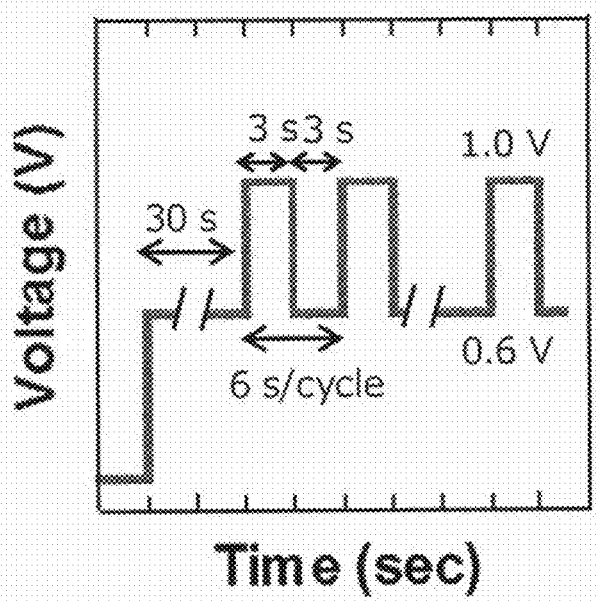
FIG. 20 is an explanatory view of an FCCJ protocol applied to a durability (load cycle) test.

Further, an FCCJ protocol (load response test) of the samples in Example 1 and Comparative example 1 manufactured in Electrode example 1 was carried out under the following conditions to evaluate the durability of the catalyst. FIG. 20 shows an explanatory view of the FCCJ protocol applied to the durability test. In one cycle, a load of 0.6 V and a load of 1.0 V were applied, each load applied for three seconds. After sweeping is carried out for a predetermined number of cycles, the CV measurement and the LSV measurement were carried out in a way similar to that described above, whereby the ECSA and the mass activity were evaluated.

Figure 21:
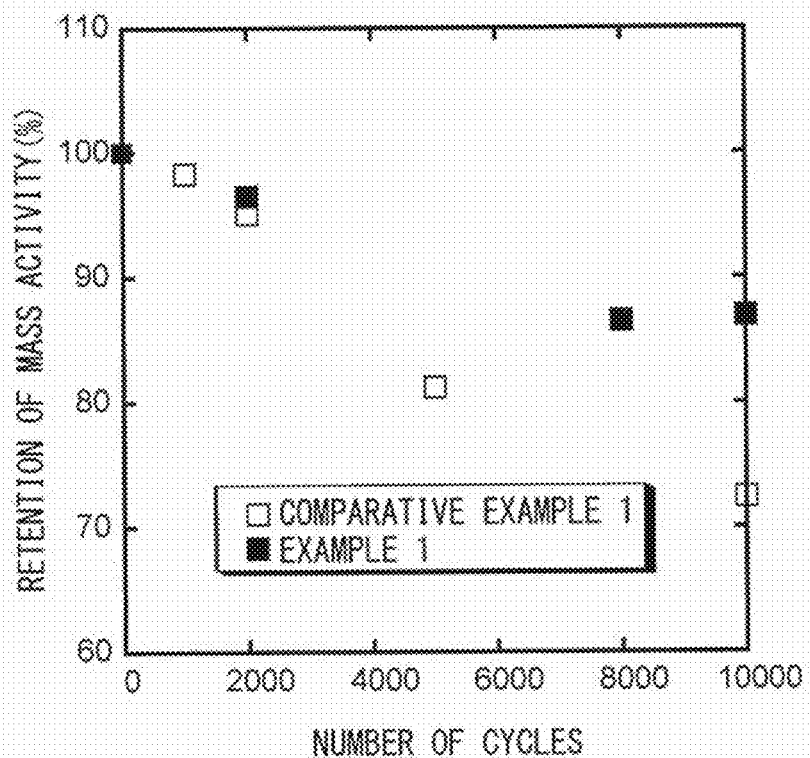
FIG. 21 is a view in which a retention of a mass activity when the load cycle test is performed is plotted with respect to the number of cycles in the sample manufactured using Electrode example 1.
Figure 22:
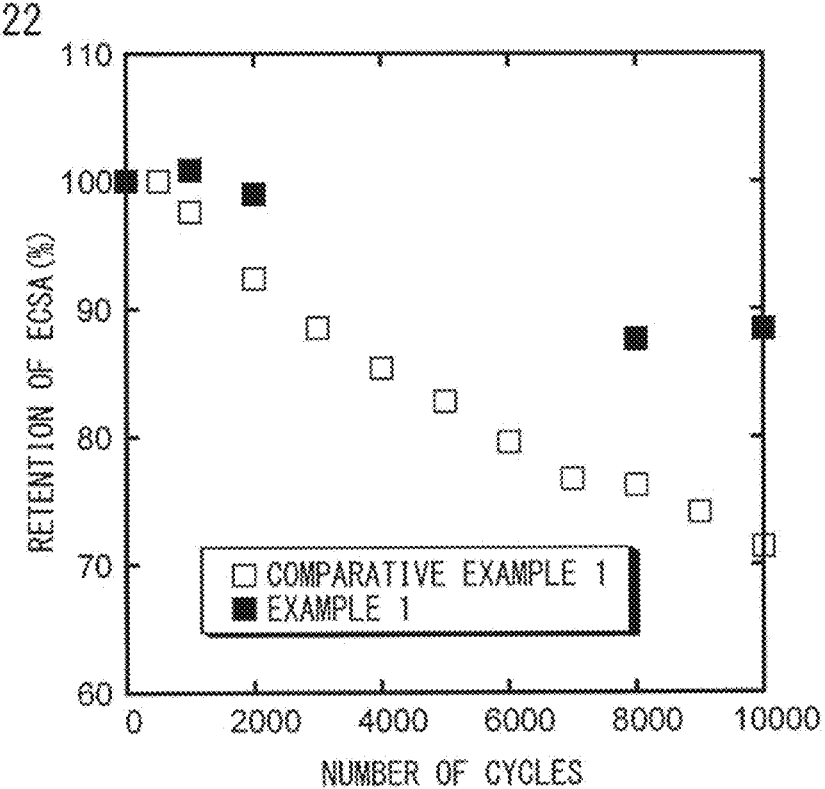
FIG. 22 is a view in which a retention of an ECSA when the load cycle test is carried out is plotted with respect to the number of cycles in the sample manufactured using Electrode example 1.

FIG. 21 is a view in which changes in mass activity of the samples in Example 1 and Comparative example 1 manufactured in Electrode example 1 when the durability test was conducted was normalized with initial values, and FIG. 22 is a view in which changes in ECSA of the same samples when the durability test was performed was normalized with initial values. Table 1 shows the mass activity of the oxygen reduction reaction and ECSA of the capsule-like catalyst in Example 1 in the initial state and after 10,000 cycles, and the mass activity of the oxygen reduction reaction and ECSA of the catalyst in Comparative example 1 in the initial state and after 10,000 cycles.

TABLE 1

| | Mass activity mA/mg-Pt | ECSA $m^2$-Pt/g-Pt |
|---|---|---|
| Example 1 (Initial state→After 10,000 cycles) | 89→78 | 20→18 |
| Comparative example 1 (Initial state→After 10,000 cycles) | 169→122 | 65→47 |

FIGS. 21 and 22 show that the catalyst in Example 1 exhibits a durability higher than that of the Pt/C catalyst.

Figure 23:
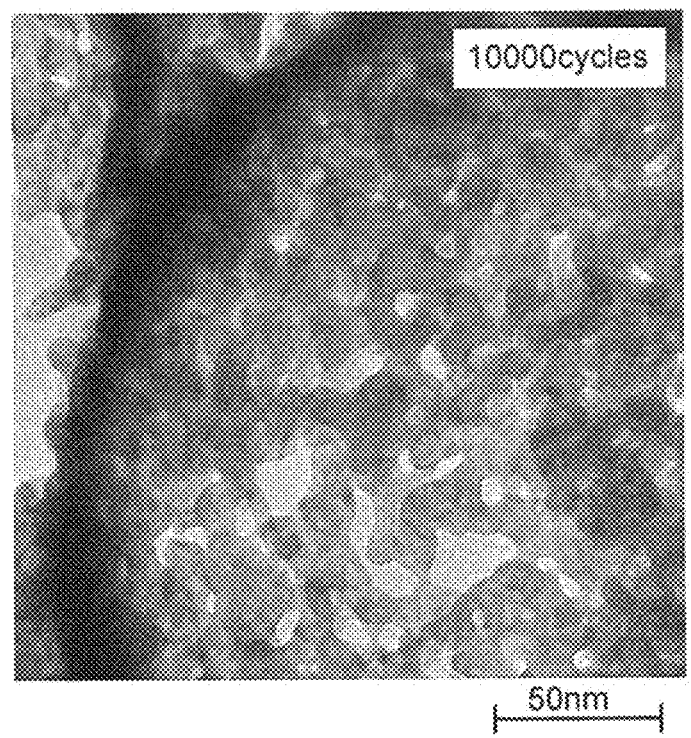
FIG. 23 is a transmission electron microscope image after the load cycle test (10,000 cycles) of the sample manufactured using Example 1.

FIG. 23 shows a TEM image of the catalysts in Example 1 after 10,000 cycles was carried out in the durability test. As shown in FIG. 23, it is confirmed that the network-like metallic catalysts are maintained even after 10,000 cycles was carried out.

Table 2 shows initial values of catalyst activity evaluation (ECSA, mass activity, and specific activity) of the samples in Example 1 manufactured in Electrode example 2 and Comparative example 1 manufactured in Electrode example 1.

TABLE 2

| Catalyst | ECSA ($m^2_{Pt}/g_{-Pt}$) | Mass activity ($A/mg_{Pt}$) | Specific activity ($mA/cm^2_{Pt}$) |
|---|---|---|---|
| Example 1 | 21 ± 1 | 0.52 ± 0.03 | 2.4 ± 0.10 |
| Comparative example 1 | 72 ± 5 | 0.20 ± 0.01 | 0.26 ± 0.02 |

Table 2 reveals that the mass activity in the sample in Example 1 is about 2.5 times larger than that in the sample in Comparative example 1 and the specific activity in the sample in Example 1 is about 10 times larger than that in the sample in Comparative example 1.

Figure 24:
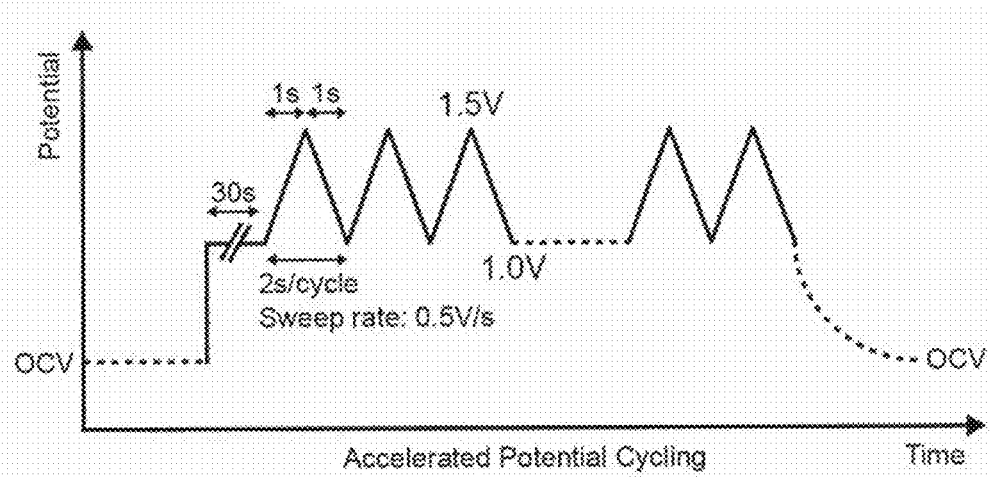
FIG. 24 is an explanatory view of the FCCJ protocol applied to the durability (start/stop) test.

The FCCJ protocol (start/stop test) that accelerates corrosion of the carbon supports was conducted for the samples in Example 1 manufactured in Electrode example 2 and Comparative example 1 manufactured in Electrode example 1 under the following conditions, whereby the durability of the catalysts was evaluated. FIG. 24 shows an explanatory view of the FCCJ protocol applied to the durability test. In one cycle, triangular wave of 1.0-1.5 V was swept at 0.5 V/s at the temperature of 60° C. After a predetermined number of cycles are carried out, the CV measurement and the LSV measurement were carried out in a way similar to that described above, whereby the ECSA, the mass activity, and the specific activity were evaluated.

Figure 25:
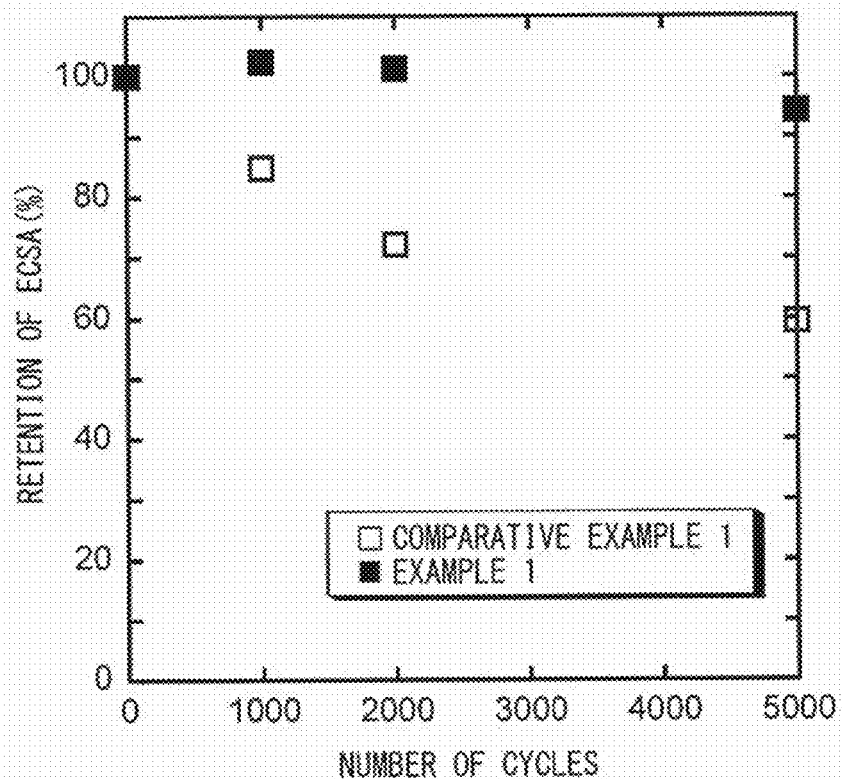
FIG. 25 is a view in which the retention of the ECSA when the start/stop test is carried out is plotted with respect to the number of cycles.
Figure 26:
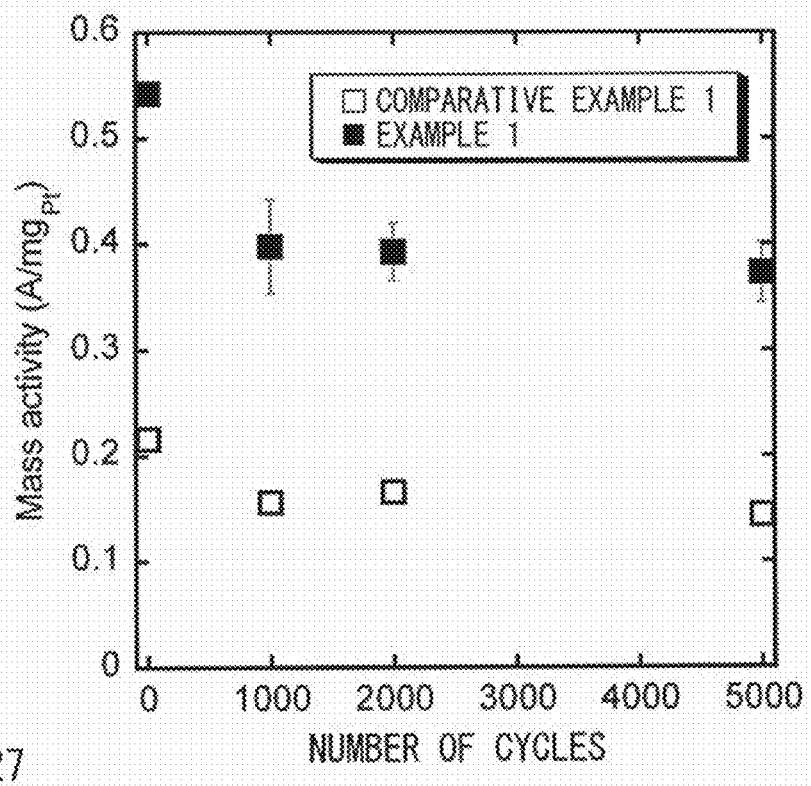
FIG. 26 is a view in which changes in mass activity when the start/stop test is performed are plotted with respect to the number of cycles.
Figure 27:
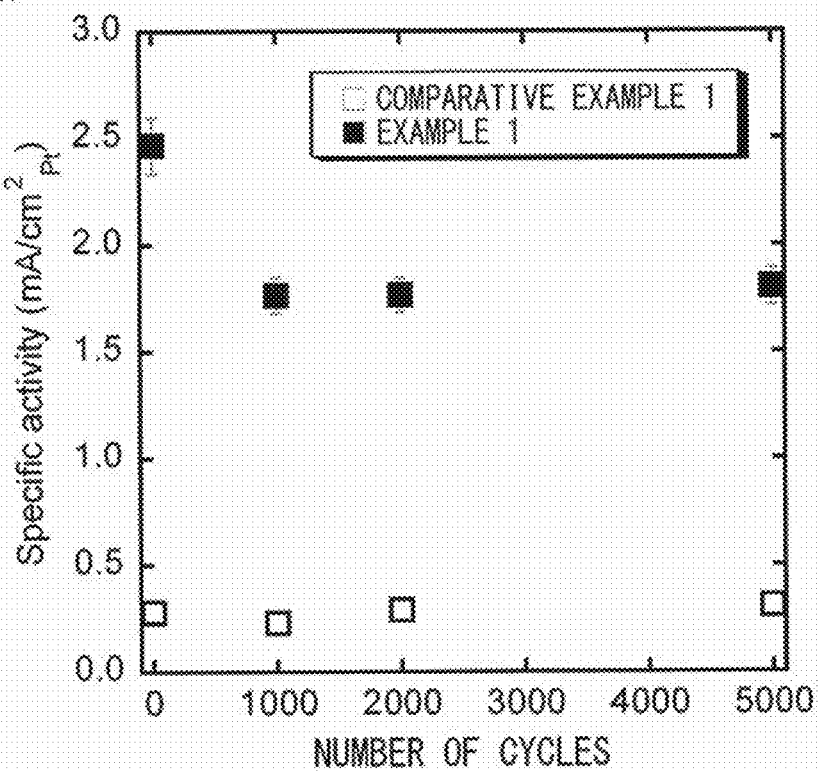
FIG. 27 is a view showing changes in a specific activity with respect to the number of cycles when the start/stop test is carried out.

FIG. 25 shows results of the retention of the ECSA when the start/stop test was performed, FIG. 26 shows changes in the mass activity, and FIG. 27 shows changes in the specific activity.

While the retention of the ECSA after 5000 cycles is reduced to about 60% of the initial state in Comparative example 1, the retention the ECSA of about 90% of the initial state was maintained in Example 1. It is considered that the reduction rate of the ECSA in Example 1 is lower than that in Comparative example 1 since Example 1 does not include carbon supports and thus carbon corrosion does not occur in Example 1. The results shown in FIG. 25 strongly supports that the aggregation of the catalysts is suppressed and the network structure in which catalysts are linked is maintained in Example 1.

The retention of the mass activity after 5000 cycles is 60-70% both in Example 1 and Comparative example 1. The initial activity is higher, however, in Example 1, which means the catalyst activity is sufficiently high in Example 1 even after the durability test.

Figure 28:
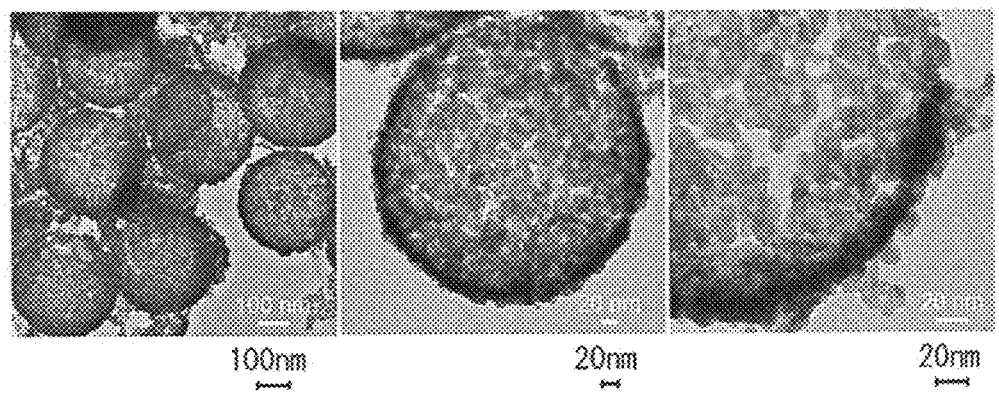
FIG. 28 is TEM images of the sample manufactured using Example 1 after the start/stop test (5000 cycles)

FIG. 28 shows TEM images of Example 1 after the start/stop test (5000 cycles). FIG. 28 shows that the shape of the capsules is maintained even after the start/stop test is performed for 5000 cycles.

Manufacture of Membrane-Electrode Assembly (MEA)

Example 3

The MBA was manufactured by the following procedure using the catalyst in Example 1:Nafion (registered trademark, 5 wt %)=20:15 (Pt: 0.26 mg/cm$^2$) as the cathode catalyst, catalyst in Comparative example 1:Nafion:PTFE (Polytetrafluoroethylene)=60:25:15 (Pt: 0.3 mg/cm$^2$) as the anode catalyst, and the Nafion (NR-212) membrane as the electrolyte membrane.

First, a method for manufacturing the diffusion layer will be described. First, a Teflon (registered trademark)-treated carbon paper (manufactured by Toray Industries, Inc.) was cut into a 3×3 cm piece by a knife, carbon black (Vulcan XC-72, manufactured by Canot) was sufficiently crushed in an agate mortar, 0.370 g of carbon black was weighted, 4.000 g of IPA was added to carbon black, and the mixture was stirred and was subjected to ultrasonic treatment for a number of times. Then, 0.140 g of PTFE suspension (60 wt % dispersion in water, manufactured by Aldrich) was added, and the mixture was stirred for about one minute. Then, printing on a Teflon-treated carbon paper was repeated twice by a screen printing method, and the paper was baked at 280° C. for two hours and at 350° C. for two hours to obtain the diffusion layer.

Next, a method for manufacturing the anode catalyst layer will be described. The catalyst in Comparative example 1 was weighted, 0.6-0.8 g of RO water was introduced in the catalyst, and the mixture was stirred. Then, 2.711 g of 5 wt % Nation solution was added. The stirring and ultrasonic treatment were repeated for about 20 to 30 minutes, 0.135 g of 60 wt % PTFE suspension was added, and the mixture was stirred for about one minute. After that, printing, by a screen printing method, on the diffusion layer which had been manufactured on the carbon paper, was conducted. The anode catalyst layer was weighted to calculate the amount of platinum loading.

Next, a method for manufacturing the cathode catalyst layer will be described. The electrolyte membrane which was cut into a square piece having a side of 4 cm was sufficiently cleaned and dried. A catalyst ink in which the catalyst in Example 1, Nation, and IPA were mixed at a predetermined ratio (catalyst:Nafion (5 wt %):IPA=20:15:2) was applied to one surface of the electrolyte membrane by a spray method to form a cathode. Then the aforementioned square-shaped anode catalyst layer having a side of 2.25 cm was arranged on the opposite plane, and this layer was set in a hot press and thermally compressed at 130° C. and 2 kN for one minute to obtain the MEA. The diffusion layer was arranged in the cathode of the resultant MEA and was set in a single cell (manufactured by Electrochem. Inc.; FC05-01SP-REF, electrode area 5 cm$^2$, flow channel pattern; serpentine flow), where a power generating test was conducted.

Figure 29:
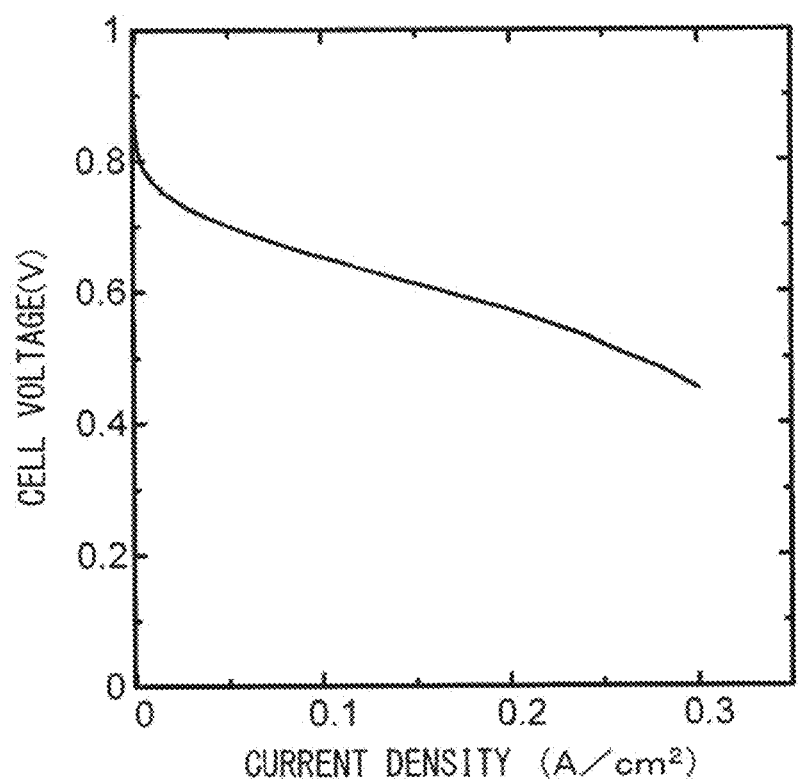
FIG. 29 is a view showing results of current-voltage characteristics of an MEA according to Example 3.

The anode was supplied with $H_2$ (100 mL/min) and the cathode was supplied with $O_2$ (500 mL/min) using the MEA obtained in Example 3, and the evaluation of the current-voltage characteristics (IV test) was conducted at the cell temperature of 80° C. and the relative humidity of 90%. FIG. 29 shows the result of the IV test. The result shows that the capsule catalysts in Example 1 form the electrically conductive network, which exhibits the power generation performance.

Example 4

The MEA was manufactured according to the following procedure using the catalyst in Example 1:Nafion ionomer=20:1 mass ratio (Pt: 0.36 mg/cm$^2$) as the cathode catalyst, the catalyst made of Pt/C in Comparative example 1:Nafion ionomer=2:1 mass ratio (Pt: 0.18 mg/cm$^2$) as the anode catalyst, and the Nafion (NR-212) membrane as the electrolyte membrane.

In Example 4, the diffusion layer is not used, as is different from Example 3. A method for manufacturing the anode catalyst layer will be described. After 0.3 g of catalyst in Comparative example 1 was weighted, the catalyst was introduced in 11.7 g of IPA aqueous solution (RO water: IPA=1:4 mass ratio). Next, 3.0 g of 5 wt % Nation solution was added. A zirconia ball (Φ1 mm) was then added, and the solution was mixed by ball milling at 400 rpm for one hour. After the ball milling is carried out, the zirconia ball was removed, and the resultant catalyst ink was applied to one surface of the electrolyte membrane (NR-212 membrane cut into a square piece having a side of 4 cm and is sufficiently cleaned and dried) by a spray method, whereby a square-shaped anode having a side of 2.25 cm was formed. The anode catalyst layer was weighed to calculate the amount of platinum loading.

Next, a method for manufacturing the cathode catalyst layer will be described. After 20 mg of catalyst in Example 1 was weighted, the catalyst was introduced in 7.5 g of IPA aqueous solution (RO water:IPA=1:4 mass ratio). Then, 20 mg of 5 wt % Nafion solution was added. The catalyst ink which was subjected to ultrasonic treatment was applied to one surface of the electrolyte membrane (the opposite surface of the anode catalyst layer) by a spray method, thereby forming a square-shaped cathode having a side of 2.25 cm. The cathode catalyst layer was then weighted to calculate the amount of platinum loading. Then, Teflon (registered trademark)-treated carbon papers (manufactured by Toray Industries, Inc.) having a size of 2.25×2.25 cm were arranged on the anode catalyst layer and the cathode catalyst layer, and was set in a hot press and thermally compressed at 130° C. and 2 kN for one minute to obtain the MEA. The resultant MEA was set in a single cell (manufactured by Electrochem. Inc.; FC05-01SP-REF, electrode area 5 cm$^2$, flow channel pattern; serpentine flow), where a power generating test was conducted.

Figure 30:
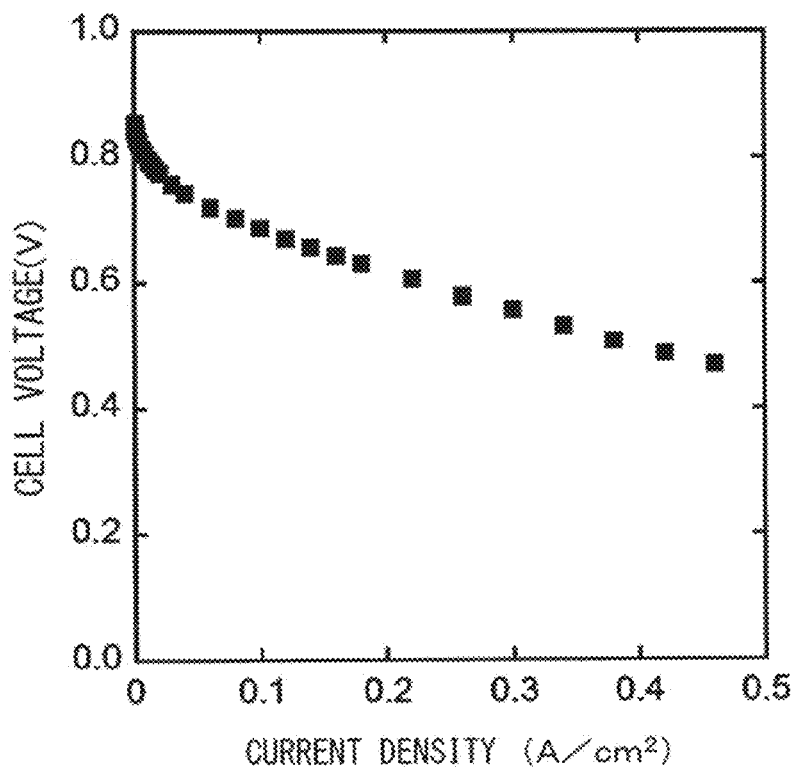
FIG. 30 is a view showing current-voltage characteristics of a sample according to Example 4.

Using the MEA obtained in Example 4, the anode was supplied with $H_2$ (100 mL/min) and the cathode was supplied with $O_2$ (500 mL/min), and the evaluation of the current-voltage characteristics (IV test) was conducted at the cell temperature of 80° C. and the relative humidity of 90%. Then, at the cell temperature of 80° C. and the relative humidity of 100%, the anode was supplied with $H_2$ (100 mL/min) and the cathode was supplied with $N_2$ (500 mL/min). The cathode $N_2$ gas was cut off just prior to the CV measurement, and the ECSA was evaluated from the CV measurement in which the voltage between 0.05 and 0.9 V was swept at 50 mV/s. FIG. 30 shows the result of the IV test. It was confirmed from FIG. 30 that the capsule catalysts form the electrically conductive network, which exhibits the power generation performance.

Further, the MEA obtained in Example 4 was set in a single cell (manufactured by Electrochem. Inc.; FC05-01SP-REF, electrode area 5 cm$^2$, flow channel; serpentine flow), and the FCCJ protocol (start/stop test) to accelerate corrosion of the carbon supports was conducted under the conditions shown in FIG. 24, whereby the durability of the MEA was evaluated. The anode was supplied with Hs (100 mL/min) and the cathode was supplied with $N_2$ (500 mL/min), and triangular wave of 1.0-1.5 V were swept at 0.5 V/s at the cell temperature of 80° C. and the relative humidity of 100% in one cycle. After a predetermined number of cycles are carried out, the CV measurement in the MEA was carried out in a way similar to that described above, whereby the ECSA was evaluated.

Figure 31:
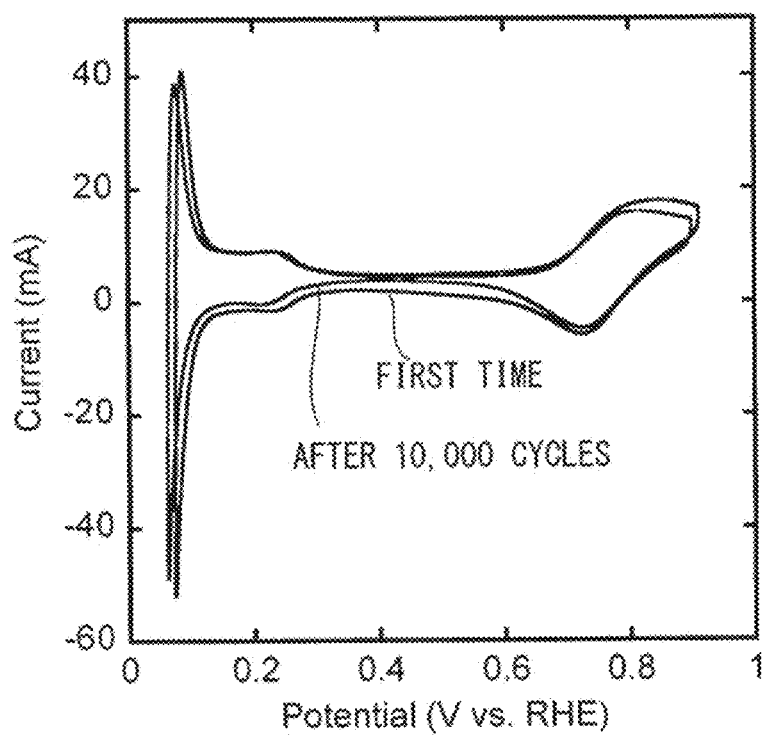
FIG. 31 shows CV curves before and after a start/stop test (10,000 cycles) of the sample according to Example 4.
Figure 32:
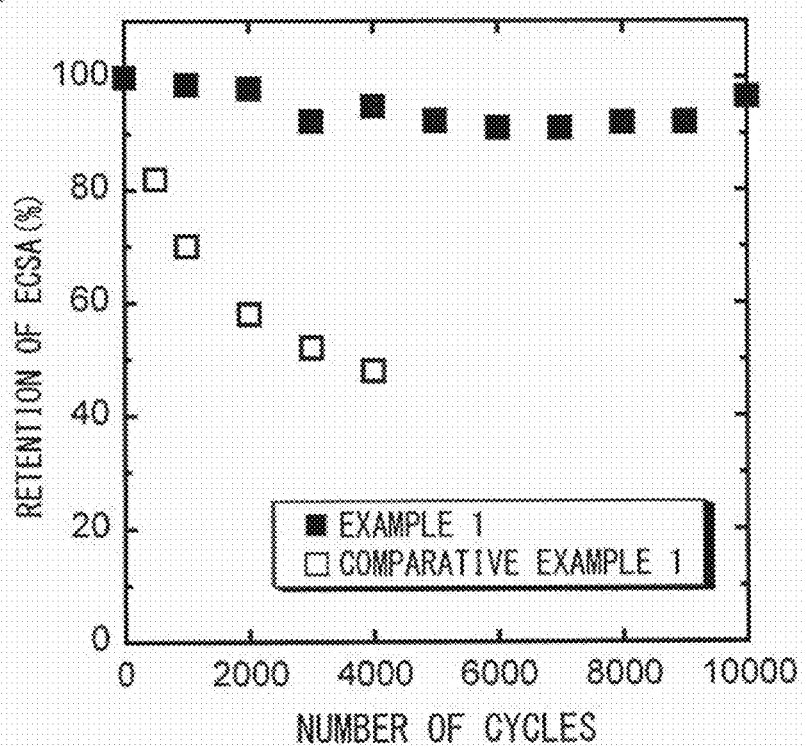
FIG. 32 is a view in which a retention of an ECSA of the sample according to Example 4 when the start/stop test is carried out is plotted with respect to the number of cycles.

FIG. 31 shows results of the CV measurement of the MEA in Example 4 before the durability test and after 10,000 cycles. FIG. 32 is a view in which changes in the ECSA of the MEA in Example 4 when the durability test was performed were normalized with initial values. Comparative example shown in FIG. 32 is the results in the MEA in which an anode/cathode catalyst layer was manufactured from carbon-supported platinum catalyst Pt/C cited from the "Cell Evaluation and Analysis Protocol Guideline", NEDO, p 17-18 (2012). It is seen from FIGS. 31 and 32 that the MEA in Example 4 exhibits excellent durability.

Figure 33:
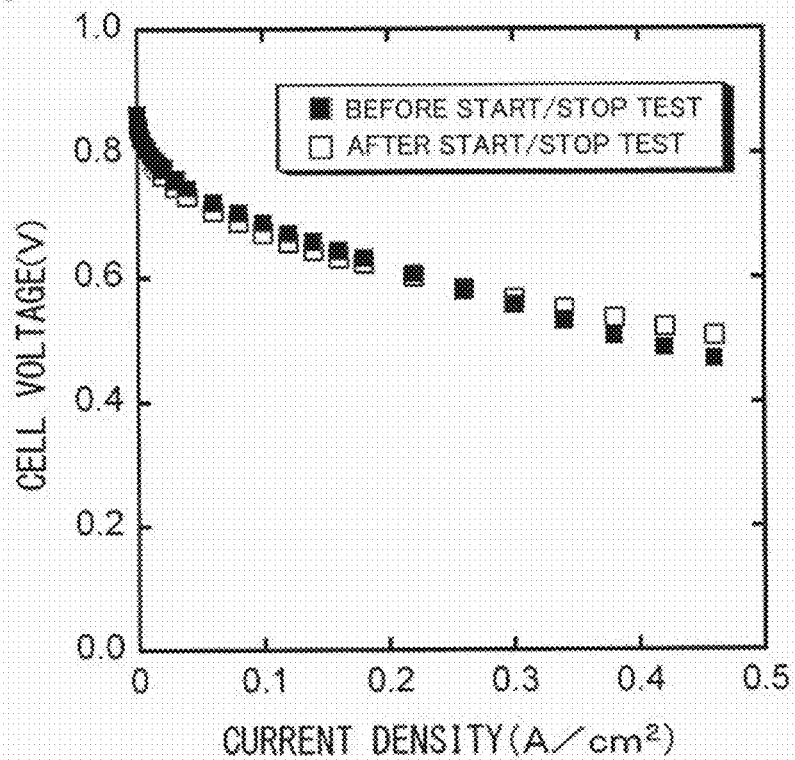
FIG. 33 shows IV curves before and after the start/stop test (10,000 cycles) of the sample according to Example 4.

FIG. 33 shows IV curves of the MEA in the Example 4 before the start/stop test and after the start/stop test (after 10,000 cycles). It is confirmed in FIG. 33 that the IV performance was maintained even after 10,000 cycles is carried out.

Example 5

Using catalyst in Example 1:Nafion ionomer=20:2 mass ratio (Pt: 0.3 mg/cm$^2$) as the cathode catalyst, catalyst in Comparative example 1:Nafion ionomer=2:1 mass ratio (Pt: 0.3 mg/cm) as the anode catalyst, and a Nafion (NR-212) membrane as the electrolyte membrane, the MEA was prepared according to the following procedure.

First, a method for manufacturing the anode catalyst layer will be described. After 0.4 g of catalyst in Comparative example 1 was weighted, 2 mL of RO water and 25 mL of IPA were added to the catalyst. Then, 0.9 g of 20 wt % Nafion solution was added. The catalyst ink which was subjected to ultrasonic treatment was applied to one surface of the electrolyte membrane (NR-212 membrane which is cut to a square having a side of 4 cm and sufficiently cleaned and dried) by a spray method to form a square-shaped anode having a side of 2.25 cm. The anode catalyst layer was then weighted to calculate the amount of platinum loading.

Next, a method for manufacturing the cathode catalyst layer will be described. After 20 mg of catalyst in Example 1 was weighted, 6 mL of RO water and 4 mL of IPA were added to the catalyst. Then, 10 mg of 20 wt % Nafion solution was added. The catalyst ink which was subjected to ultrasonic treatment was applied to one surface of the electrolyte membrane (opposite surface of the anode catalyst layer) by a spray method to form a square-shaped cathode having a side of 2.25 cm. The cathode catalyst layer was then weighted to calculate the amount of platinum loading. Subsequently, a Teflon (registered trademark)-treated carbon paper (manufactured by Toray Industries, Inc.) having a size of 2.25×2.25 cm was arranged on the anode catalyst layer and the cathode catalyst layer, and was set in a hot press to be thermally compressed at 130° C. and 2 kN for one minute, thereby obtaining the MEA.

Figure 34:
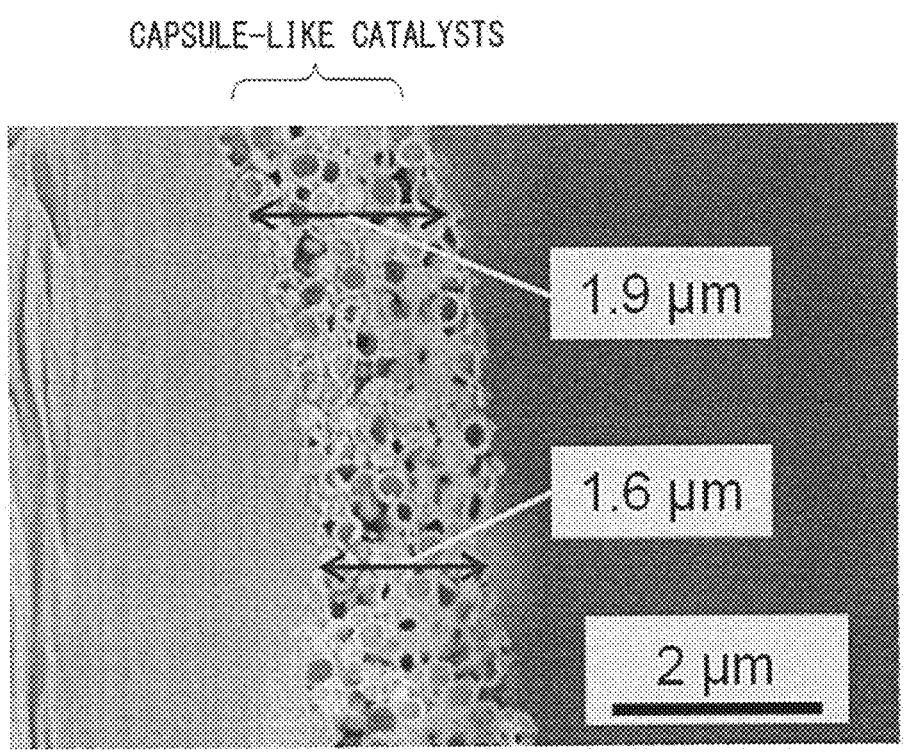
FIG. 34 shows an SEM image in which a cathode catalyst layer according to Example 5 is partially enlarged.

FIG. 34 shows an SEM image in which the cathode catalyst layer of the MEA in the Example 5 is partially enlarged. As shown in FIG. 34, the thickness of the catalyst layer is 1.5 to 2 μm, which is thinner than the thickness (about 10 μm) of the catalyst layer according to the related art having the same platinum catalyst amount (reference: Y. Hashimasa et al., *ECS transaction*, 50 (2012) 723-732).

From the invention thus described, it will be obvious that the embodiments of the invention may be varied in many ways. Such variations are not to be regarded as a departure from the spirit and scope of the invention, and all such modifications as would be obvious to one skilled in the art are intended for inclusion within the scope of the following claims.

What is claimed is:

1. A catalyst layer for gas diffusion electrode comprising:
    a network-like metallic catalyst formed of a sintered body, the network-like metallic catalyst comprising nanoparticles linked with each other to have electron conductivity; and
    an ion conductor, at least a part of the ion conductor contacting the network-like metallic catalyst,
    wherein the network-like metallic catalyst is carbon support free; and
    wherein the network-like metallic catalyst has a superlattice structure; and
    wherein the network-like metallic catalyst contains an FePt alloy.

2. The catalyst layer for gas diffusion electrode according to claim 1, wherein the network-like metallic catalyst is at least one of a capsule-like catalyst, a rod-like catalyst, and a sheet-like catalyst.

3. The catalyst layer for gas diffusion electrode according to claim 1, wherein the ion conductor is a cation conductor or an anion conductor.

4. The catalyst layer for gas diffusion electrode according to claim 1, wherein the catalyst layer has a thickness of 10 μm or smaller.

5. A membrane electrode assembly comprising a polymer electrolyte membrane provided between an anode catalyst layer and a cathode catalyst layer, the membrane electrode assembly using the catalyst layer for gas diffusion electrode according to claim 1 in at least one of the anode catalyst layer and the cathode catalyst layer.

6. The membrane electrode assembly according to claim 5, wherein the thickness of the catalyst layer for gas diffusion electrode is 10 μm or smaller.

7. A fuel cell comprising the catalyst layer for gas diffusion electrode according to claim 1.

8. The fuel cell according to claim 7, comprising: a polymer electrolyte membrane, and an anode unit and a cathode unit that hold the polymer electrolyte membrane, wherein the catalyst layer for gas diffusion electrode is arranged in at least one of the anode unit and the cathode unit that contacts with the polymer electrolyte membrane.

9. The catalyst layer for gas diffusion according to claim 1, wherein the inside network-like metallic catalyst is hollow and the network-like metallic catalyst has a net-like skeleton structure.

10. The catalyst layer for gas diffusion electrode according to claim 1, wherein the catalyst layer has a thickness of 2 μm or smaller.

11. The catalyst layer for gas diffusion electrode according to claim 1, wherein the catalyst layer has a thickness of 0.5 μm or smaller.

12. The membrane electrode assembly according to claim 5, wherein the thickness of the catalyst layer for gas diffusion electrode is 2 μm or smaller.

13. The membrane electrode assembly according to claim 5, wherein the thickness of the catalyst layer for gas diffusion electrode is 0.5 μm or smaller.

14. The catalyst layer for gas diffusion electrode according to claim 1, wherein the super-lattice structure is an fct ordered structure or an fcc ordered structure.

15. The catalyst layer for gas diffusion electrode according to claim 2, wherein the capsule-like catalyst is one in which a plurality of capsule-like catalysts are fused with each other.

16. The catalyst layer for gas diffusion electrode according to claim 1, wherein the network-like metallic catalyst contains iron.

* * * * *